US009557434B2

(12) United States Patent
Keller et al.

(10) Patent No.: US 9,557,434 B2
(45) Date of Patent: Jan. 31, 2017

(54) APPARATUS AND METHOD FOR DETECTING FRACTURE GEOMETRY USING ACOUSTIC TELEMETRY

(71) Applicants: Stuart R. Keller, Houston, TX (US); Timothy I. Morrow, Humble, TX (US); Max Deffenbaugh, Fulshear, TX (US); Mark M. Disko, Glen Gardner, NJ (US); David A. Stiles, Spring, TX (US)

(72) Inventors: Stuart R. Keller, Houston, TX (US); Timothy I. Morrow, Humble, TX (US); Max Deffenbaugh, Fulshear, TX (US); Mark M. Disko, Glen Gardner, NJ (US); David A. Stiles, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 94 days.

(21) Appl. No.: 14/434,730

(22) PCT Filed: Dec. 18, 2013

(86) PCT No.: PCT/US2013/076284
§ 371 (c)(1),
(2) Date: Apr. 9, 2015

(87) PCT Pub. No.: WO2014/100274
PCT Pub. Date: Jun. 26, 2014

(65) Prior Publication Data
US 2015/0285937 A1    Oct. 8, 2015

Related U.S. Application Data

(60) Provisional application No. 61/739,678, filed on Dec. 19, 2012.

(51) Int. Cl.
*E21B 47/16*    (2006.01)
*G01V 1/52*    (2006.01)
(Continued)

(52) U.S. Cl.
CPC .................. *G01V 1/52* (2013.01); *E21B 43/26* (2013.01); *E21B 47/122* (2013.01); *E21B 47/14* (2013.01);
(Continued)

(58) Field of Classification Search
CPC ........ E21B 43/26; E21B 47/122; E21B 47/14; E21B 47/16; E21B 49/00; G01V 11/002; G01V 1/40; G01V 1/52; G01V 2210/123; G01V 2210/1234; G01V 2210/1429; G01V 2210/646
(Continued)

(56) References Cited

U.S. PATENT DOCUMENTS

| 4,314,365 A | 2/1982 | Peterson et al. |
| 4,884,071 A | 11/1989 | Howard |

(Continued)

FOREIGN PATENT DOCUMENTS

| EP | 0 636 763 | 2/1995 |
| EP | 1 409 839 | 4/2005 |

(Continued)

OTHER PUBLICATIONS

Emerson Process Management (2011), "Roxar downhole Wireless PT sensor system," www.roxar.com, or downhole@roxar.com, 2 pgs.

*Primary Examiner* — Ojiako Nwugo
(74) *Attorney, Agent, or Firm* — ExxonMobil Upstream Resarch Company—Law Department

(57) ABSTRACT

An electro-acoustic system for downhole telemetry employs a series of communications nodes spaced along a string of
(Continued)

casing within a wellbore. The nodes allow wireless communication between transceivers residing within the communications nodes and a receiver at the surface. The transceivers provide node-to-node communication of data indicating elastic waves generated as a result of the formation of subsurface fractures. The data is processed which generates a map of fracture geometry. A method of evaluating fracture geometry in a subsurface formation uses a plurality of data transmission nodes situated along the casing string which send signals to a receiver at the surface. The signals are analyzed which generates a subsurface map.

41 Claims, 7 Drawing Sheets

(51) Int. Cl.
| | |
|---|---|
| G01V 1/40 | (2006.01) |
| E21B 43/26 | (2006.01) |
| E21B 47/12 | (2012.01) |
| E21B 47/14 | (2006.01) |
| E21B 49/00 | (2006.01) |
| G01V 11/00 | (2006.01) |

(52) U.S. Cl.
CPC .............. *E21B 47/16* (2013.01); *E21B 49/00* (2013.01); *G01V 1/40* (2013.01); *G01V 11/002* (2013.01); *G01V 2210/123* (2013.01); *G01V 2210/1234* (2013.01); *G01V 2210/1429* (2013.01); *G01V 2210/646* (2013.01)

(58) Field of Classification Search
USPC .............................. 340/854.4, 854.8; 367/82
See application file for complete search history.

(56) References Cited

U.S. PATENT DOCUMENTS

| | | | |
|---|---|---|---|
| 4,914,433 A * | 4/1990 | Galle .................... | E21B 47/122 340/854.4 |
| 5,128,901 A | 7/1992 | Drumheller | |
| 5,234,055 A | 8/1993 | Cornette | |
| 5,278,359 A * | 1/1994 | Miller ...................... | G01V 1/52 175/4.55 |
| 5,480,201 A | 1/1996 | Mercer | |
| 5,495,230 A | 2/1996 | Lian | |
| 5,562,240 A | 10/1996 | Campbell | |
| 5,592,438 A | 1/1997 | Rorden et al. | |
| 5,850,369 A | 12/1998 | Rorden et al. | |
| 5,924,499 A | 7/1999 | Birchak et al. | |
| 6,049,508 A | 4/2000 | Deflandre | |
| 6,429,784 B1 | 8/2002 | Beique et al. | |
| 6,462,672 B1 | 10/2002 | Besson | |
| 6,670,880 B1 | 12/2003 | Hall et al. | |
| 6,695,277 B1 | 2/2004 | Gallis | |
| 6,717,501 B2 | 4/2004 | Hall et al. | |
| 6,816,082 B1 | 11/2004 | Laborde | |
| 6,868,037 B2 | 3/2005 | Dasgupta et al. | |
| 6,899,178 B2 | 5/2005 | Tubel | |
| 6,912,177 B2 | 6/2005 | Smith | |
| 6,987,463 B2 | 1/2006 | Beique et al. | |
| 7,006,918 B2 | 2/2006 | Economides et al. | |
| 7,064,676 B2 | 6/2006 | Hall et al. | |
| 7,082,993 B2 | 8/2006 | Ayoub et al. | |
| 7,140,434 B2 | 11/2006 | Chouzenoux et al. | |
| 7,224,288 B2 | 5/2007 | Hall et al. | |
| 7,249,636 B2 | 7/2007 | Ohmer | |
| 7,257,050 B2 | 8/2007 | Stewart et al. | |
| 7,277,026 B2 | 10/2007 | Hall et al. | |
| 7,317,990 B2 | 1/2008 | Sinha et al. | |
| 7,348,893 B2 | 3/2008 | Huang et al. | |
| 7,477,160 B2 | 1/2009 | Lemenager et al. | |
| 7,516,792 B2 | 4/2009 | Lonnes et al. | |
| 7,595,737 B2 | 9/2009 | Fink et al. | |
| 7,602,668 B2 | 10/2009 | Liang et al. | |
| 7,649,473 B2 | 1/2010 | Johnson et al. | |
| 7,775,279 B2 | 8/2010 | Marya et al. | |
| 8,044,821 B2 | 10/2011 | Mehta | |
| 8,049,506 B2 | 11/2011 | Lazarev | |
| 8,115,651 B2 | 2/2012 | Camwell et al. | |
| 8,162,050 B2 | 4/2012 | Roddy et al. | |
| 8,220,542 B2 | 7/2012 | Whitsitt et al. | |
| 8,237,585 B2 | 8/2012 | Zimmerman | |
| 8,242,928 B2 | 8/2012 | Prammer | |
| 8,330,617 B2 | 12/2012 | Chen et al. | |
| 8,347,982 B2 | 1/2013 | Hannegan et al. | |
| 8,381,822 B2 | 2/2013 | Hales et al. | |
| 8,434,354 B2 | 5/2013 | Crow et al. | |
| 8,496,055 B2 | 7/2013 | Mootoo et al. | |
| 8,539,890 B2 | 9/2013 | Tripp et al. | |
| 2002/0026958 A1 | 3/2002 | Brisco | |
| 2002/0043369 A1 | 4/2002 | Vinegar et al. | |
| 2003/0056953 A1 | 3/2003 | Tumlin et al. | |
| 2004/0065443 A1 | 4/2004 | Berg et al. | |
| 2004/0066313 A1 * | 4/2004 | Ong ....................... | G08C 19/04 340/870.11 |
| 2004/0073370 A1 | 4/2004 | Dasgupta et al. | |
| 2004/0084190 A1 | 5/2004 | Hill et al. | |
| 2004/0105342 A1 | 6/2004 | Gardner et al. | |
| 2004/0256113 A1 | 12/2004 | LoGiudice et al. | |
| 2005/0024231 A1 | 2/2005 | Fincher et al. | |
| 2005/0035875 A1 * | 2/2005 | Hall ........................ | E21B 47/12 340/853.1 |
| 2005/0039912 A1 | 2/2005 | Hall et al. | |
| 2005/0145010 A1 | 7/2005 | Vanderveen et al. | |
| 2005/0284659 A1 | 12/2005 | Hall et al. | |
| 2006/0002232 A1 | 1/2006 | Shah et al. | |
| 2006/0023567 A1 * | 2/2006 | Uhl ........................ | G01V 1/40 367/13 |
| 2006/0115095 A1 | 6/2006 | Giesbrecht et al. | |
| 2006/0124310 A1 | 6/2006 | Lopez de Cardenas et al. | |
| 2006/0133203 A1 | 6/2006 | James et al. | |
| 2007/0024464 A1 | 2/2007 | Lemenager et al. | |
| 2007/0029112 A1 | 2/2007 | Li et al. | |
| 2007/0030762 A1 | 2/2007 | Huang et al. | |
| 2007/0139217 A1 | 6/2007 | Beique et al. | |
| 2009/0045974 A1 | 2/2009 | Patel | |
| 2009/0159272 A1 | 6/2009 | Auzerias et al. | |
| 2009/0264956 A1 | 10/2009 | Rise et al. | |
| 2009/0277688 A1 | 11/2009 | Oothoudt | |
| 2009/0283259 A1 * | 11/2009 | Poitzsch ................. | E21B 43/26 166/250.01 |
| 2009/0283261 A1 * | 11/2009 | Poitzsch ................. | E21B 19/22 166/250.02 |
| 2009/0289808 A1 | 11/2009 | Prammer | |
| 2010/0013663 A1 | 1/2010 | Cavender et al. | |
| 2010/0118657 A1 * | 5/2010 | Trinh ..................... | E21B 47/011 367/82 |
| 2010/0126718 A1 | 5/2010 | Lilley | |
| 2010/0157739 A1 | 6/2010 | Slocum et al. | |
| 2010/0176813 A1 | 7/2010 | Simon | |
| 2010/0194584 A1 | 8/2010 | Savage | |
| 2011/0066378 A1 | 3/2011 | Lerche et al. | |
| 2011/0168403 A1 | 7/2011 | Patel | |
| 2011/0186290 A1 | 8/2011 | Roddy et al. | |
| 2011/0192593 A1 * | 8/2011 | Roddy .................... | E21B 33/13 166/250.01 |
| 2011/0275313 A1 | 11/2011 | Baldemair et al. | |
| 2011/0280294 A1 | 11/2011 | Luo et al. | |
| 2011/0297376 A1 | 12/2011 | Holderman et al. | |
| 2012/0017673 A1 | 1/2012 | Godager | |
| 2012/0024050 A1 | 2/2012 | Godager | |
| 2012/0024052 A1 | 2/2012 | Eriksen | |
| 2012/0043079 A1 | 2/2012 | Wassouf et al. | |
| 2012/0090687 A1 | 4/2012 | Grisby et al. | |
| 2012/0170410 A1 | 7/2012 | Hay | |
| 2012/0241172 A1 | 9/2012 | Ludwig et al. | |
| 2012/0256415 A1 | 10/2012 | Dole | |
| 2012/0256492 A1 | 10/2012 | Song et al. | |
| 2012/0257475 A1 | 10/2012 | Luscombe et al. | |
| 2013/0008648 A1 | 1/2013 | Lovorn et al. | |
| 2013/0106615 A1 | 5/2013 | Prammer | |

(56) References Cited

U.S. PATENT DOCUMENTS

| | | |
|---|---|---|
| 2013/0110402 A1 | 5/2013 | Godager |
| 2013/0175094 A1 | 7/2013 | Ross et al. |
| 2013/0233537 A1* | 9/2013 | McEwen-King ....... E21B 43/26 166/250.1 |
| 2013/0248174 A1 | 9/2013 | Dale et al. |
| 2014/0083675 A1* | 3/2014 | Grigsby .................. E21B 43/04 166/65.1 |
| 2014/0083681 A1* | 3/2014 | Taylor ...................... G01V 1/42 166/250.1 |
| 2014/0169127 A1* | 6/2014 | Orban ...................... G01V 1/40 367/25 |
| 2014/0169128 A1* | 6/2014 | Orban .................... G01V 1/143 367/25 |
| 2014/0169129 A1* | 6/2014 | Orban ...................... G01V 1/40 367/25 |

FOREIGN PATENT DOCUMENTS

| | | |
|---|---|---|
| WO | WO 2010/074766 | 7/2010 |
| WO | WO 2013/079928 | 6/2013 |
| WO | WO 2013/079929 | 6/2013 |

* cited by examiner

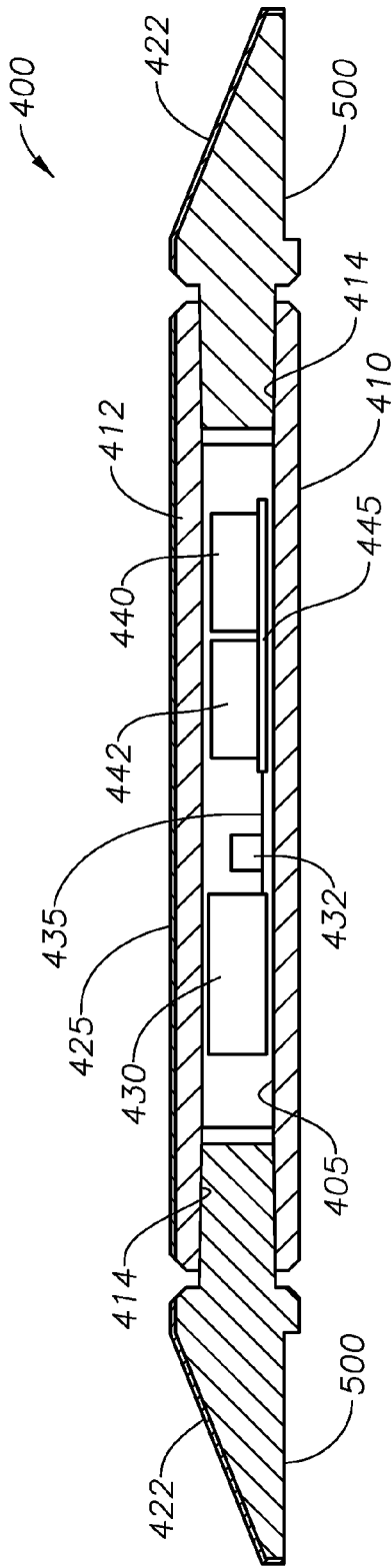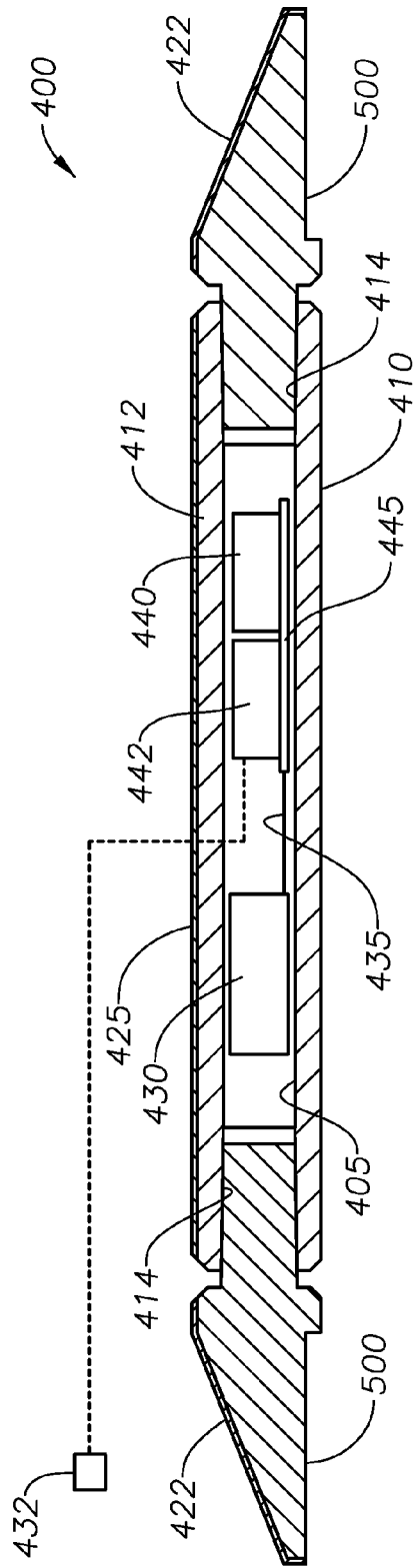
FIG. 4B
FIG. 4C

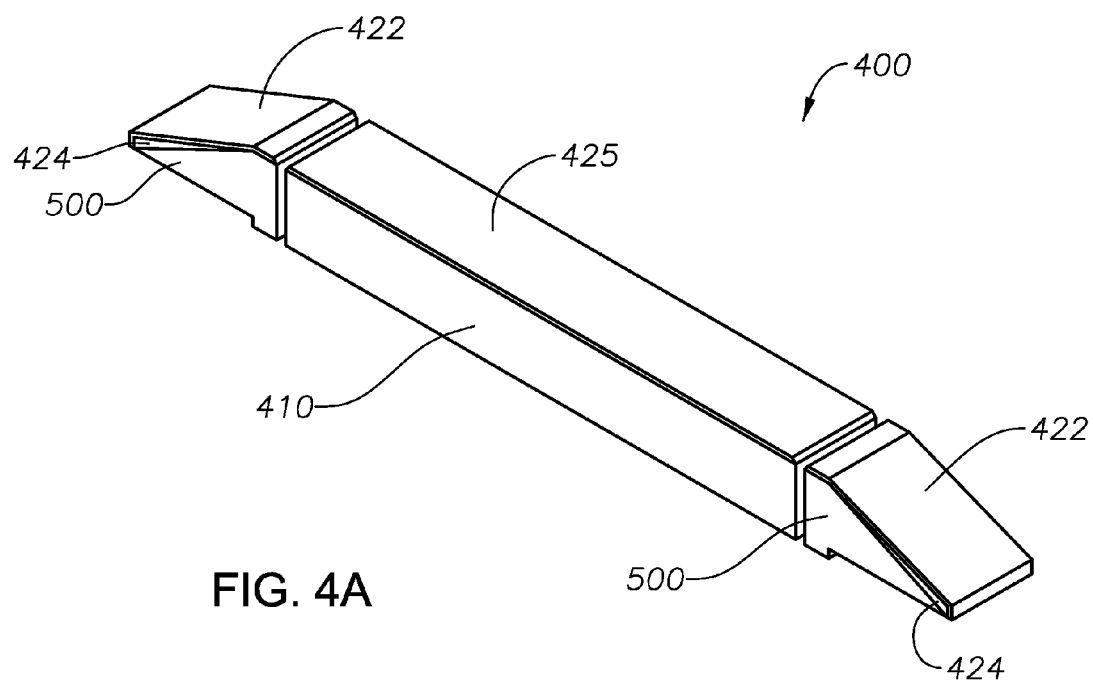
FIG. 4A
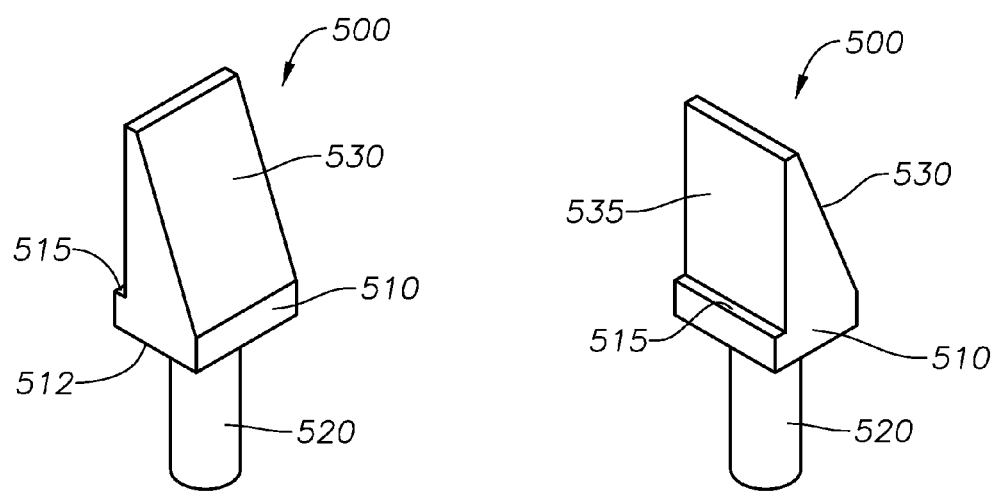
FIG. 5A
FIG. 5B

APPARATUS AND METHOD FOR DETECTING FRACTURE GEOMETRY USING ACOUSTIC TELEMETRY

CROSS REFERENCE TO RELATED APPLICATIONS

This application is the National Stage of International Application No. PCT/US2013/076284, filed Dec. 18, 2013, which claims the benefit of U.S. Provisional Patent Application No. 61/739,678 filed Dec. 19, 2012, the disclosure of which is hereby incorporated by reference in its entirety. This application is also related to U.S. Ser. Nos. 61/739,414 (PCT/US2013/076273), 61/739,677 (PCT/US2013/076286), 61/739,679 (PCT/US2013/076282), and 61/739,681 (PCT/US2013/076278), each filed on Dec. 19, 2012, the entire contents of each of which are also hereby incorporated by reference herein.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present invention relates to the field of well drilling and completions. More specifically, the invention relates to the transmission of data along a tubular body within a wellbore. The present invention further relates to the formation of artificial fractures in a subsurface formation along a wellbore and the detection of fracture geometry.

GENERAL DISCUSSION OF TECHNOLOGY

Natural resources sometimes reside in subsurface formations in the form of a fluid. Such natural resources include oil, gas, coal bed methane, and geothermal steam. Typically, such natural resources reside many feet below the surface.

In order to access hydrocarbon fluids or steam, one or more wellbores is formed from the surface down to the depth of the subsurface formation. The wellbore provides fluid communication between the surface and the subsurface formation. Fluids may then be transported to the surface, either by means of reservoir pressure, by artificial pressure, or through pumping.

The recovery of such natural resources is sometimes made difficult by the nature of the rock matrix in which they reside. In this respect, some rock matrices have very limited permeability. Such "tight" or "unconventional" formations may be sandstone, siltstone, or shale formations. Alternatively, such unconventional formations may include coalbed methane. In any instance, "low permeability" typically refers to a rock interval having permeability that is at about 1 millidarcy or less. Examples of formations where the rock matrix has low permeability are the shale gas reservoirs found in North America. These include the Marcellus shale formation, the Barnett shale formation, the Haynesville shale formation, and the Horn River shale formation. Another example of a formation where the rock matrix has low permeability is the so-called tight gas sandstone and siltstone intervals found in the Piceance Basin.

It is known in the oil and gas industry to increase permeability in a subsurface rock matrix through hydraulic fracturing. Hydraulic fracturing is a technique involving the injection of fluid under high pressure into a selected subsurface zone. The fluid is pumped into the wellbore, and then injected through perforations previously shot in production casing and into the surrounding rock matrix. Typically, the rock matrix is a hydrocarbon bearing formation. The fluid is injected at a pressure sufficient enough to create fractures within the rock matrix extending from the perforations. This pressure is sometimes referred to as a "parting" pressure or a "fracturing" pressure. Preferably, the fluid includes a proppant used to hold the fractures open after the fluid pressure is relieved.

It is desirable to monitor the propagation of hydraulic fractures within a subsurface formation. Knowing the geometry of hydraulically-induced fractures is helpful for optimizing the production of oil and gas from wells completed in the so-called "tight" formations. Fracture geometry impacts both individual well performance and overall reservoir production efficiency.

Currently, the geometry of induced fractures is assessed either by using geophones at the surface or by lowering an array of geophones into a well on a cable or wireline. The geophones detect or "listen for" micro-seismic events during or following a hydraulic fracturing operation. These events are recorded and the event data is then analyzed at the surface to obtain a representation of the fracture geometry.

FIG. 1 is a side view of a field 100 being developed for the production of hydrocarbon fluids. This view demonstrates the use of geophones 118 to record micro-seismic events, in one method.

In FIG. 1, two illustrative wells 110, 120 are shown in the field 100. The first well is an offset well 110. The offset well 110 may be a previously existing producer that has been temporarily shut in. Alternatively, the offset well 110 may be a dedicated monitoring well. The second well is a production well, or producer 120. The producer 120 is formed for the purpose of producing hydrocarbon fluids (such as non-condensable hydrocarbons, or so-called natural gas) to a surface 102.

Each well 110, 120 extends from the surface 102 into a subsurface 130. The wells 110, 120 further extend into a formation 150, which represents an area from which hydrocarbon fluids are to be produced. This area may be referred to as a "pay zone."

The first well 110 has a well head 112 at the surface 102. The well head 112 has one or more pressure control valves 113. The first well 110 is completed with one or more strings of casing 114. The strings of casing 114 define a bore 115 that extend substantially into the subsurface formation 150.

In the arrangement of FIG. 1, the bore 115 has received a wireline 116. The wireline 116 supports a linear array of geophones 118. The geophones 118 represent transducers that convert elastic (or "seismic") waves into electrical signals. These signals are then transmitted through the wireline 116 and up to the surface 102. From there, the signals are processed.

The second well 120 is undergoing completion. The second well 120 has a well control assembly 122 at the surface 102. The well control assembly 122 includes one or more pressure control valves (or master valves) 123. The second well 120 is completed with one or more strings of casing 124. The strings of casing 124 extend from the well control assembly 122 down substantially into the subsurface formation 150. In this way, a bore 125 is formed.

In the arrangement of FIG. 1, the bore 125 has received an injection tubing 126. The injection tubing 126 may be, for example, a string of coiled tubing. A packer 128 has been set at a lower end of the injection tubing 126. The packer 128 serves to isolate an annular area 129 between the injection tubing 126 and the surrounding casing 124 during a fluid injection operation.

The illustrative formation 150 defines a rock matrix having a low permeability. Accordingly, it is desirable to undertake a hydraulic fracturing operation. In this way, artificial fractures may be formed in the formation, or pay zone 150.

In the view of FIG. 1, injection fluids are being injected down the injection tubing 126 to the level of the subsurface formation 150. The flow of injection fluids is indicated by arrow "I." The injection fluids "I" are a so-called frac fluid. The injection fluids are being pumped under pressure through perforations (not shown) in the casing 124 and into the subsurface formation 150. The formation 150 is thus undergoing a fracturing operation through the production well 120.

It can be seen in FIG. 1 that a number of fractures 156 are being formed in the rock matrix making up the subsurface formation 150. The fractures 156 open up the formation 150 along a fracture plane 155. The fractures 156 extend outwardly from the well 120 through fracture tips. One illustrative fracture tip 152 is indicated along the fracture plane 155.

As the fracture tip 152 extends and as the fractures 156 open up along the fracture plane 155, shear movement takes place within the rock matrix making up the subsurface formation 150. This shear movement generates elastic waves, referred to as micro-seisms or micro-seismic events. The shear waves are indicated schematically by dashed lines 154. The shear waves are detected by the geophones 118.

The use of geophones 118 in this manner has limitations. Using geophones in an offset well (such as well 110) requires shutting in production at the well for a period of time. This time period includes the time in which the geophones 118 are lowered into the offset well 110, plus the time for fracturing the well 120 being completed. Additionally, there is a concern that the offset well 110 may be too far from the well 120 being completed to detect at least some of the micro-seismic events 154 due to signal attenuation through the rock matrix. The operator may then be faced with a decision as to whether to incur the expense necessary to drill a dedicated monitoring well.

In some fields, dedicated monitoring wells are drilled for the purpose of analyzing core samples and for taking pressure, temperature or other measurements. However, monitoring wells are rarely available and are expensive to provide.

It is also known to place an array of geophones at the surface. However, using geophones located at the surface means that there is likely a significant distance between the geophones (or hydrophones, as the case may be) and the subsurface fractures 156 being formed. This, in turn, will likely cause the geophones to miss many micro-seismic events due to signal attenuation through many thousands of feet of rock (and, possibly, water). Also, surface geophones on land are subject to signal interference due to the presence of trucks, drilling operations, and other surface disturbances.

Finally, it is known to place geophones into the well 120 undergoing completion itself. However, lowering geophones into the well undergoing fracturing entails a risk that the geophones may get stuck downhole. This would require an expensive fishing operation or even "drilling out" the sensors. Further, lowering large geophones into a wellbore can be operationally difficult due to surface equipment space requirements. The operator could use a lubricator over the wellhead, but this adds time and expense to the drilling and completion operation and does nothing to add to the available limited diameter space within the injection tubing 126.

Therefore, a need exists for an acoustic telemetry system that enables the operator to receive acoustic signals at high data transmission rates, with such signals being indicative of elastic waves from a well undergoing fracturing. Further, a need exists for a wireless downhole telemetry system that allows an operator to map the geometry of subsurface fractures without need of an offset well.

SUMMARY OF THE INVENTION

An electro-acoustic telemetry system for evaluating fracture geometry in a subsurface formation is provided herein. The system employs a series of communications nodes spaced along a wellbore. Each node transmits a signal that represents a packet of information. The packet of information includes both an identifier and an acoustic wave. The signals are relayed up the wellbore from node-to-node in order to transmit signals to a receiver at the surface.

The system first includes a string of casing. The casing string is disposed in the wellbore. In actuality, the wellbore may have more than one casing string placed in series, including a string of surface casing, one or more intermediate casing strings, and a production casing. It is also to be understood herein that any reference to a string of casing includes a liner. In any aspect, the wellbore is completed for the purpose of conducting hydrocarbon recovery operations. The wellbore may be, for example, a producer or an injector.

The system also includes at least two sensors. The sensors are disposed along the wellbore at a depth of the subsurface formation. The sensors may be, for example, microphones or tri-axial geophones, and detect seismic events downhole.

The system further comprises a series of communications nodes. The communications nodes are placed along an outer wall of the casing string. The communications nodes are configured to relay acoustic signals indicative of elastic waves caused by movement of rock within the subsurface formation during a wellbore operation. The elastic waves are detected by the sensors and then converted to acoustic signals by electro-acoustic transducers.

In one aspect, the series of communications nodes first comprises three or more sensor communications nodes. The sensor communications nodes are connected to the casing string at the depth of the subsurface formation. The sensor communications nodes are configured to receive signals from the respective sensors. Preferably, the sensor communications nodes actually house the sensors along with an electro-acoustic transducer and an associated transceiver.

The series of communications nodes also includes a topside communications node. The topside communications node is placed along the casing string proximate a surface. The surface may be an earth surface. Alternatively, in a subsea context, the surface may be an offshore platform or vessel. Preferably, the topside communications node is attached to the well head at the surface and above grade.

The series of communications nodes also includes a plurality of intermediate communications nodes. The intermediate communications nodes are spaced along the wellbore between the sensor communications nodes and the topside communications node. In one aspect, the intermediate communications nodes are spaced at between about 10 to 100 foot (3.0 to 30.5 meter) intervals. More preferably, the intermediate communications nodes are spaced at between about 20 to 40 foot (6.1 to 12.2 meter) intervals. Even more preferably, the intermediate communications nodes are spaced at one node per joint of pipe making up the casing string, although some embodiments may have two nodes, depending upon signal strength and length of pipe joint. The intermediate communications nodes are configured to transmit acoustic waves from node-to-node, up to the topside communications node.

Each of the communications nodes has a sealed housing for holding electronics. In addition, each node relies upon an independent power source. The power source may be, for example, batteries or a fuel cell. The power source resides within the housing.

In addition, each of the subsurface communications nodes has an electro-acoustic transducer along with an associated transceiver for transmitting acoustic signals. In one aspect, the sensor communications nodes and the intermediate communications nodes transmit data as mechanical waves at a rate exceeding about 50 bps. In one aspect, the transceivers are designed to receive acoustic waves at a first frequency, and then transmit or relay the acoustic waves at a second different frequency.

The system also includes a receiver. The receiver is positioned at the surface and is configured to receive signals from the topside communications node. The signals originate with the various sensor communications nodes in the wellbore. In one aspect, the receiver is in electrical communication with the topside communications node by means of an electrical wire or through a wireless data transmission such as Wi-Fi or Blue Tooth.

The receiver collects the packets of information delivered from the sensor communications nodes. This information may then be compiled using seismic data analysis software, and analyzed.

A method of evaluating fracture geometry in a subsurface formation is also provided herein. The method uses a plurality of communications nodes situated along a casing string to accomplish a wireless transmission of data along the wellbore. The data represents acoustic waveforms that indicate the presence of elastic waves within the subsurface formation during a wellbore operation, such as a formation fracturing operation.

The method first includes running joints of pipe into the wellbore. The joints of pipe make up the casing string, and are connected together at threaded couplings. The joints of pipe are fabricated from a steel material and have a resonant frequency. The resonant frequency is within the width of frequency used for acoustic transmission of the waveforms.

The method also provides for attaching a series of communications node to the joints of pipe according to a pre-designated spacing. In one aspect, each joint of pipe above the subsurface formation receives a communications node. Preferably, each of the subsurface communications nodes is attached to a joint of pipe by one or more clamps. In this instance, the step of attaching the communications nodes to the joints of pipe comprises clamping the communications nodes to an outer surface of the joints of pipe.

In one aspect, the series of communications nodes includes a topside communications node. This is the uppermost communications node along the wellbore, meaning that the topside communications node is attached to a joint of casing proximate the surface. More preferably, the topside communications node is connected to a well head at the surface, or to a tubular body immediately downstream from the well head. The topside communications node transmits signals from an uppermost subsurface communications node to a receiver at the surface.

The communications nodes also include a plurality of subsurface communications nodes residing along the casing string below the topside communications nodes. The subsurface communications nodes reside in spaced-apart relation along the casing string. The subsurface communications nodes are configured to transmit acoustic waves from the subsurface formation to the topside communications node.

Each subsurface communications node includes a transceiver that receives an acoustic signal from a previous communications node, and then transmits or relays that acoustic signal to a next communications node, in node-to-node arrangement. In a preferred embodiment, multiple frequency shift keying (MFSK) is the modulation scheme enabling the transmission of information.

Selected subsurface communications nodes will house a geophone as a sensor. The geophone detects seisms and sends an electrical signal indicative of that seism to an electro-acoustic transducer. The transducer converts the electrical signal to an acoustic signal, which is then transmitted as a waveform by an associated transceiver.

Each waveform represents a packet of information. The information comprises an identifier for the communications node originally transmitting the signal, and an acoustic waveform indicative of elastic waves caused by movement of rock within the subsurface formation during a wellbore operation. In one aspect, the communications nodes transmit data as mechanical waves at a rate exceeding about 50 bps. Preferably, the transceivers in the communications nodes receive or continue to "listen for" the acoustic waves after reverberation of the acoustic waves from the previous communications node has substantially attenuated.

In one embodiment, the method also comprises injecting a fluid through perforations in the casing string under pressure in order to form subsurface fractures. Then, using sensors residing within selected subsurface communications nodes, the method provides for detecting the elastic waves generated as a result of injecting the fluid. Preferably, at least two sensors are provided along the casing.

The method next includes sending signals to a receiver at a surface via the series of communications nodes. The surface may be an earth surface; alternatively, the surface may be an offshore platform at a water level. The signals arrive at the surface for analysis. The method then includes analyzing the signals to determine the geographical origin of the elastic waves. A map of subsurface fractures is then generated as derived from the analyzed signals.

It is noted that the housing for each of the intermediate communications nodes is preferably fabricated from a steel material. The steel material of the housing has a resonance frequency that is within the frequency range used for acoustic transmission.

BRIEF DESCRIPTION OF THE DRAWINGS

So that the present inventions can be better understood, certain drawings, charts, graphs and/or flow charts are appended hereto. It is to be noted, however, that the drawings illustrate only selected embodiments of the inventions and are therefore not to be considered limiting of scope, for the inventions may admit to other equally effective embodiments and applications.

FIG. 4A is a perspective view of a communications node as may be used in the wireless data transmission system of the present invention, in an alternate embodiment.

FIG. 4B is a cross-sectional view of the communications node of FIG. 4A. The view is taken along the longitudinal axis of the node. Here, a sensor is provided within the communications node.

FIG. 4C is another cross-sectional view of the communications node of FIG. 4A. The view is again taken along the longitudinal axis of the node. Here, a sensor resides along the wellbore external to the communications node.

FIGS. 5A and 5B are perspective views of a shoe as may be used on opposing ends of the communications node of FIG. 4A, in one embodiment. In FIG. 5A, the leading edge, or front, of the shoe is seen. In FIG. 5B, the back of the shoe is seen.

DETAILED DESCRIPTION OF CERTAIN EMBODIMENTS

Definitions

As used herein, the term "hydrocarbon" refers to an organic compound that includes primarily, if not exclusively, the elements hydrogen and carbon. Examples of hydrocarbons include any form of natural gas, oil, coal, and bitumen that can be used as a fuel or upgraded into a fuel.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions, or at ambient conditions (20° C. and 1 atm pressure). Hydrocarbon fluids may include, for example, oil, natural gas, coal bed methane, shale oil, gas condensates, and other hydrocarbons that are in a gaseous or liquid state.

As used herein, the term "fluid" refers to gases, liquids, and combinations of gases and liquids, as well as to combinations of gases and solids, and combinations of liquids and solids.

As used herein, the term "condensable hydrocarbons" means those hydrocarbons that condense at about 15° C. and one atmosphere absolute pressure. Condensable hydrocarbons may include, for example, a mixture of hydrocarbons having carbon numbers greater than 3.

As used herein, the term "subsurface" refers to the region below the earth's surface.

As used herein, the term "sensor" includes any electrical sensing device or gauge. The sensor may be capable of monitoring or detecting pressure, temperature, fluid flow, vibration, or resistivity or other formation data. The sensor may be a geophone.

As used herein, the term "formation" refers to any definable subsurface region. The formation may contain one or more hydrocarbon-containing layers, one or more non-hydrocarbon containing layers, an overburden, and/or an underburden of any geologic formation.

The terms "zone" or "zone of interest" refer to a portion of a formation containing hydrocarbons. The term "hydrocarbon-bearing formation" may alternatively be used.

As used herein, the term "wellbore" refers to a hole in the subsurface made by drilling or insertion of a conduit into the subsurface. A wellbore may have a substantially circular cross section, or other cross-sectional shape. As used herein, the term "well," when referring to an opening in the formation, may be used interchangeably with the term "wellbore."

The terms "tubular member" or "tubular body" refer to any pipe, such as a joint of casing, a portion of a liner, a drill string, a production tubing, an injection tubing or a pup joint.

DESCRIPTION OF SELECTED SPECIFIC EMBODIMENTS

The inventions are described herein in connection with certain specific embodiments. However, to the extent that the following detailed description is specific to a particular embodiment or a particular use, such is intended to be illustrative only and is not to be construed as limiting the scope of the inventions.

Figure 1:
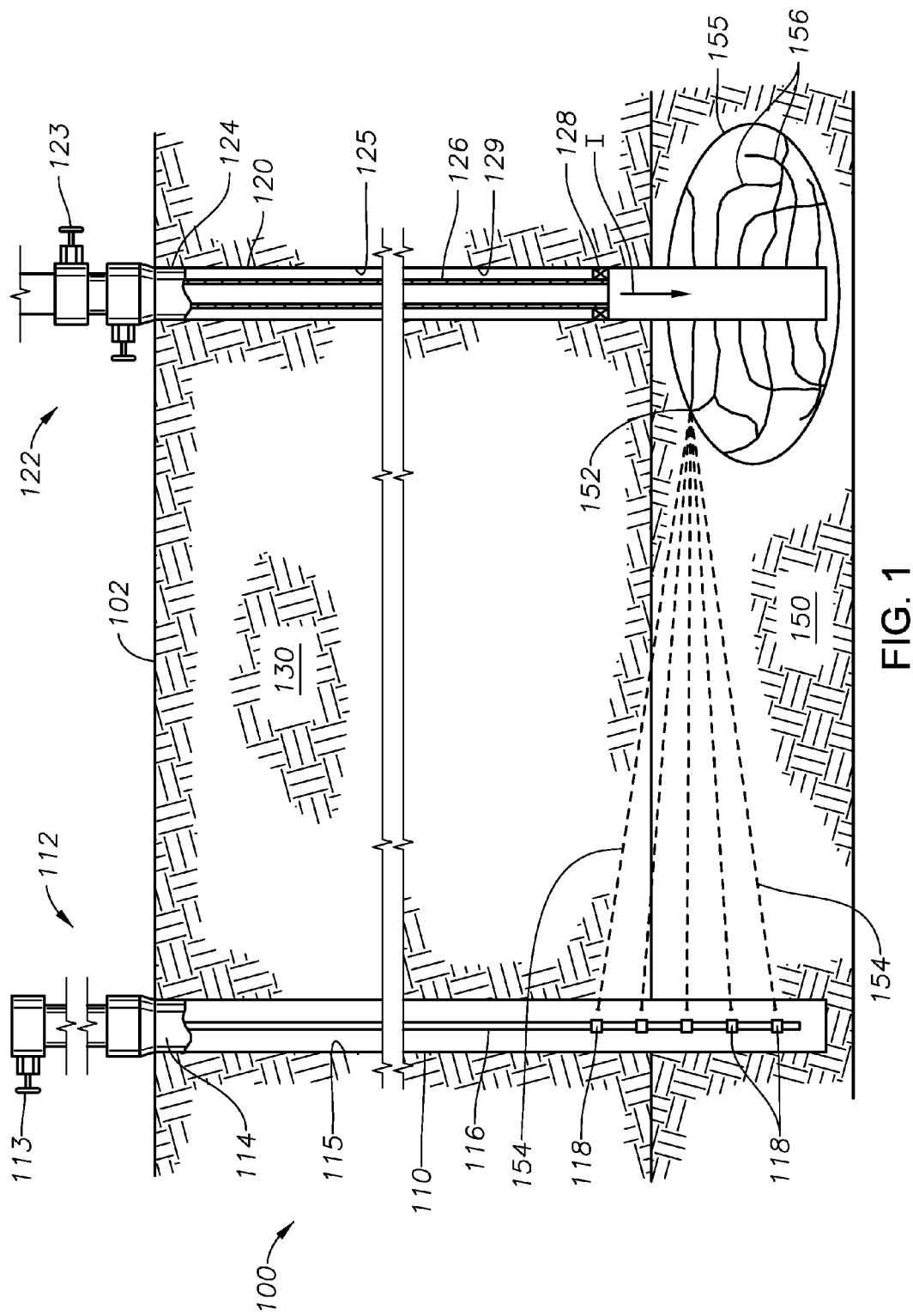
FIG. 1 is a side view of a field being developed for the production of hydrocarbon fluids. This field indicates the known use of geophones to record micro-seismic events, in one method.
Figure 2:
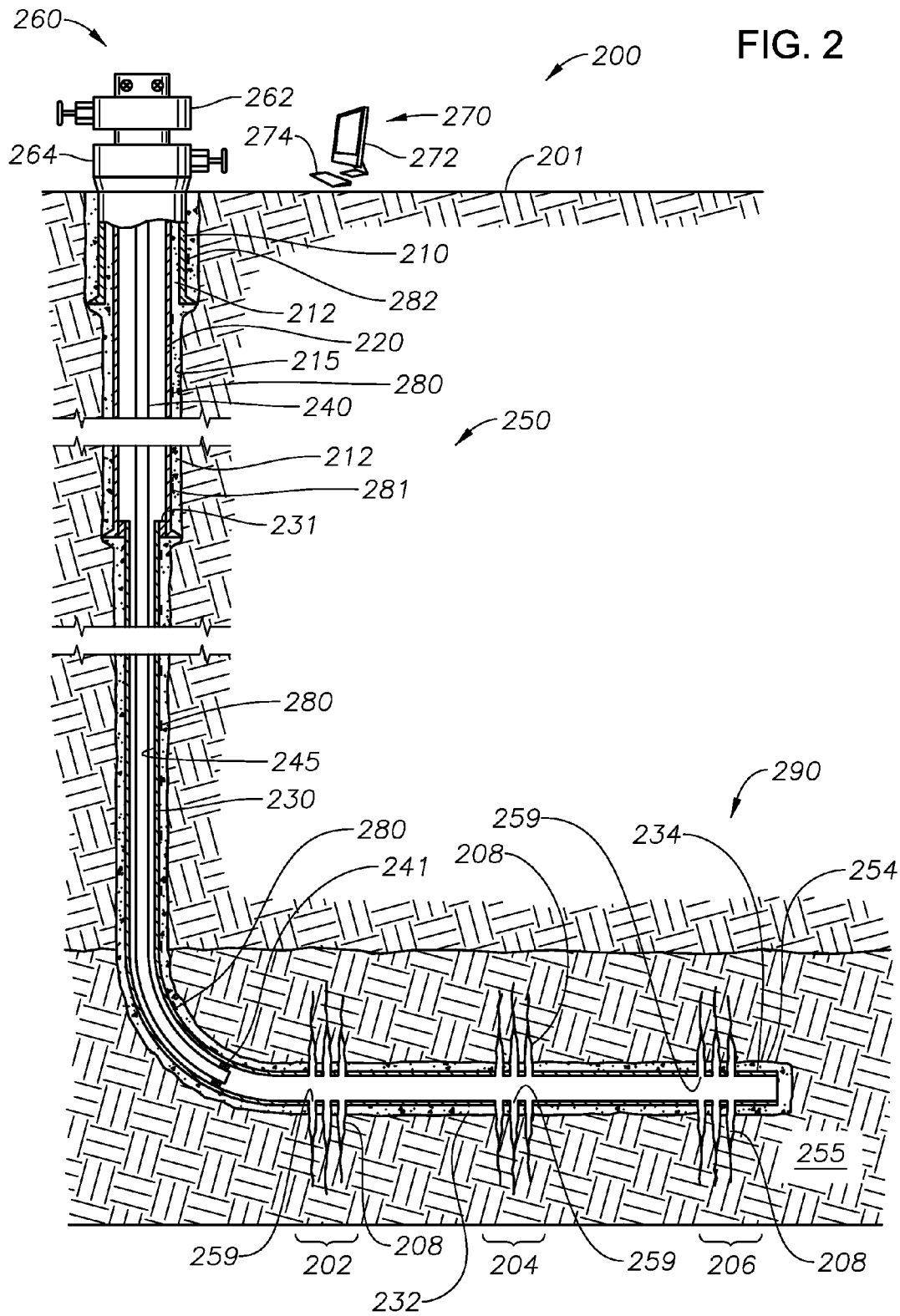
FIG. 2 is a side, cross-sectional view of a wellbore having been completed. The illustrative wellbore has been completed as a cased hole completion. A series of communications nodes is placed along a casing string as part of a telemetry system.

FIG. 2 is a cross-sectional view of an illustrative well site 200. The well site 200 includes a wellbore 250 that penetrates into a subsurface formation 255. The wellbore 250 has been completed as a cased-hole completion for producing hydrocarbon fluids. The well site 200 also includes a well head 260. The well head 260 is positioned at an earth surface 201 to control and direct the flow of formation fluids from the subsurface formation 255 to the surface 201.

Referring first to the well head 260, the well head 260 may be any arrangement of pipes or valves that receive reservoir fluids at the top of the well. In the arrangement of FIG. 2, the well head 260 is a so-called Christmas tree. A Christmas tree is typically used when the subsurface formation 255 has enough in situ pressure to drive production fluids from the formation 255, up the wellbore 250, and to the surface 201. The illustrative well head 260 includes a top valve 262 and a bottom valve 264. In some contexts, these valves are referred to as "master valves." Other valves may also be used. In a subsea context, the wellhead may also include a lower marine riser package (not shown).

It is understood that rather than using a Christmas tree, the well head 260 may alternatively include a motor (or prime mover) at the surface 201 that drives a pump. The pump, in turn, reciprocates a set of sucker rods and a connected positive displacement pump (not shown) downhole. The pump may be, for example, a rocking beam unit or a hydraulic piston pumping unit. Alternatively still, the well head 260 may be configured to support a string of production tubing having a downhole electric submersible pump, a gas lift valve, or other means of artificial lift (not shown). The present inventions are not limited by the configuration of production equipment at the surface unless expressly noted in the claims.

Referring next to the wellbore 250, the wellbore 250 has been completed with a series of pipe strings, referred to as casing. First, a string of surface casing 210 has been cemented into the formation. Cement is shown in an annular bore 215 of the wellbore 250 around the surface casing 210. The cement is in the form of an annular sheath 212. The surface casing 110 has an upper end in sealed connection with the lower valve 264.

Next, at least one intermediate string of casing 220 is cemented into the wellbore 250. The intermediate string of casing 220 is in sealed fluid communication with the upper master valve 262. A cement sheath 212 is again shown in a bore 215 of the wellbore 250. The combination of the casing 210/220 and the cement sheath 212 in the bore 215 strengthens the wellbore 250 and facilitates the isolation of formations behind the casing 210/220.

It is understood that a wellbore 250 may, and typically will, include more than one string of intermediate casing 220. In some instances, an intermediate string of casing may be a liner. Some of the intermediate casing strings may be only partially cemented into place, depending on regulatory requirements and the presence of migratory fluids in any adjacent strata.

Finally, a production string 230 is provided. The production string 230 is hung from the intermediate casing string 220 using a liner hanger 231. The production string 230 is a liner that is not tied back to the surface 201. Preferably, all of the production liner 230 is cemented in place. In the arrangement of FIG. 2, a cement sheath 232 is provided around the liner 230 along its entire length.

The production liner 230 has a lower end 234 that extends to an end 254 of the wellbore 250. For this reason, the wellbore 250 is said to be completed as a cased-hole well. The production liner 230 extends through a horizontal portion 290. The horizontal portion 290 extends laterally through the formation 255. The formation 255 may be a carbonate or sand formation having good consolidation but poor permeability. More preferably, however, the formation 255 is a shale formation having low permeability. In any instance, the formation 255 may have a permeability of less than 100 millidarcies, or less than 50 millidarcies, or less than 10 millidarcies, or even less than 1 millidarcy.

The horizontal portion 290 of the wellbore 200 typically extends for many hundreds of feet. For example, the horizontal portion 290 may extend for over 250 feet, or over 1,000 feet, or even more than 5,000 feet. Extending the horizontal portion 260 of the wellbore 200 such great distances significantly increases the exposure of the low-permeability formation 290 to the wellbore 200.

It is common for wells that are completed in so-called "tight" or "unconventional" formations to be completed horizontally. Horizontal completions not only dramatically increase exposure of the wellbore to the producing rock face, but also enables the operator to create fractures that are substantially transverse to the direction of the wellbore. Those of ordinary skill in the art may understand that a rock matrix will generally "part" in a direction that is perpendicular to the direction of least principal stress. For deeper wells, that direction is typically substantially vertical. Of course, the present inventions have equal utility in vertically completed wells or in multi-lateral deviated wells.

In order to form fractures, the wellbore 250 includes sets of perforations 259. In the view of FIG. 2, perforations 259 are provided in three separate zones 202, 204, 206. Each zone may represent, for example, a length of up to about 100 feet (30 meters). While only three sets of perforations 259 are shown, it is understood that the horizontal portion 290 may have many more sets of perforations 259 in additional zones.

The wellbore 250 of FIG. 2 also has a string of injection tubing 240. The injection tubing 240 extends from the well head 260 down to the subsurface formation 255. In the arrangement of FIG. 2, the injection tubing 240 terminates proximate an upper end of the subsurface formation 255. In operation, the operator may fracture and treat each zone 202, 204, 206 separately and sequentially. Therefore, it is understood that the injection tubing 240 will be pulled through the horizontal portion of the wellbore 250 so that injection fluids may be injected through the perforations 259 in zones 202, 204, 206 separately.

A packer 241 is provided at a lower end of the injection tubing 240. The packer 241 serves to seal off an annular region 245 between the tubing 240 and the surrounding production liner 230. The packer 241 is set when a fracturing fluid is being injected through a set of perforations 259. The packer 241 will be released when it is time to move the injection tubing 240 to a different zone, or to remove it from the wellbore 250 completely.

In preparation for the production of hydrocarbons, the operator may wish to stimulate the formation 255 by circulating an acid solution. This serves to clean out residual drilling mud both along the wall of the borehole 215 and into the near-wellbore region (the region within formation 255 close to the production casing 230). In addition, the operator may wish to fracture the formation 255. This is done by injecting a fracturing fluid under high pressure through the perforations 259 and into the formation 255. The fracturing process creates fractures 208 along the formation 255 to enhance fluid flow into the production casing 250. Where the natural or hydraulically-induced fracture plane(s) of a formation is vertical, a horizontally completed wellbore (portion 290) allows the production casing 230 to intersect multiple fracture planes.

It is desirable for the operator to understand the effectiveness of the fracturing operation. To do this, a downhole telemetry system is offered in the well site 200 of FIG. 2. The telemetry system utilizes a series of novel communications nodes 280. This is for the purpose of evaluating subsurface formation features such as (but not limited to) fracture geometry (natural, drilling induced, stimulation induced, bedding plane positioning, intrusive geologic bodies, etc.). In some embodiments, the communications nodes may be placed or positioned along the outer diameter of the casing strings 210, 220, 230. In some embodiments, the communications nodes maybe recessed within the pipe body, placed internally within the pipe body, at cross-sectional ends of the pipe joint, and/or positioned inside of the pipe through bore, and combinations thereof. These nodes allow for the high speed transmission of wireless signals based on the in situ presence of elastic waves generated during a subsurface fracturing operation.

The communications nodes 280 transmit acoustic signals. Acoustic telemetry systems are known in the industry. U.S. Pat. No. 5,924,499 entitled "Acoustic Data Link and Formation Property Sensor for Downhole MWD System" teaches the use of acoustic signals for "short hopping" a component along a drill string. Signals are transmitted from the drill bit or from a near-bit sub and across the mud motors. This may be done by sending separate acoustic signals simultaneously—one that is sent through the drill string, a second that is sent through the drilling mud, and optionally, a third that is sent through the formation. These signals are then processed to extract readable signals.

U.S. Pat. No. 6,912,177, entitled "Transmission of Data in Boreholes," addresses the use of an acoustic transmitter that is as part of a downhole tool. Here, the transmitter is provided adjacent a downhole obstruction such as a shut-in valve along a drill stem so that an electrical signal may be sent across the drill stem. U.S. Pat. No. 6,899,178, entitled "Method and System for Wireless Communications for Downhole Applications," describes the use of a "wireless tool transceiver" that utilizes acoustic signaling. Here, an acoustic transceiver is in a dedicated tubular body that is integral with a gauge and/or sensor. This is described as part of a well completion.

None of the above acoustic systems provide for the transmission of data via multiple electro-acoustic transceivers that are secured along an outer surface of a casing string using dedicated communications nodes.

In the arrangement of FIG. 2, the nodes 280 represent a plurality of subsurface communications nodes 280. Each of the subsurface communications nodes 280 is configured to receive and then relay acoustic signals along essentially the length of the wellbore 250, meaning from the subsurface formation 255 up to the surface 201. Preferably, the subsurface communications nodes 280 utilize two-way transceivers to receive and transmit signals as acoustic waves. The acoustic waves are preferably at a frequency of between about 50 kHz and 500 kHz or, more preferably, between about 100 kHz and 125 kHz.

The communications nodes also include a topside communications node 282. The topside communications node 282 is placed closest to the surface 201. The topside node 282 is configured to receive acoustic signals from an uppermost of the subsurface communications nodes 280. The signals are delivered up to the topside communications node 282, in node-to-node arrangement, and on to a receiver at the surface 201. Preferably, the topside communications node 282 is actually connected to the well head 260.

The well site 200 of FIG. 2 shows a receiver 270. The receiver 270 comprises a processor 272 that receives signals sent from the topside communications node 282. The processor 272 may include discrete logic, any of various integrated circuit logic types, or a microprocessor. The receiver 270 may also include a screen and a keyboard 274 (either as a keypad or as part of a touch screen). The receiver 270 may also be an embedded controller with neither screen nor keyboard which communicates with a remote computer via cellular modem or telephone lines. In one aspect, the processor 272 is part of a multi-purpose "smart phone" having specific "apps" and wireless connectivity.

The signals may be received by the receiver 270 through a wire (not shown) such as a co-axial cable, a fiber optic cable, a USB cable, or other electrical or optical communications wire. Alternatively, the receiver 270 may receive the final signals from the topside node 282 wirelessly through a modem or transceiver or other wireless communications link. The receiver 270 preferably receives electrical signals via a so-called Class I, Division I conduit, that is, a housing for a wire as defined by NFPA 497 and API 500 for operations in an electrically classified area. Alternatively, data can be transferred from the topside node to a receiver via an electromagnetic (RF) wireless connection. In some applications, infrared or microwave signals may be utilized.

FIG. 2 presents an illustrative wellbore 250 that may receive a downhole telemetry system using acoustic transceivers. In FIG. 2, the top of the drawing page is intended to be toward the surface and the bottom of the drawing page toward the well bottom. While wells commonly are completed in substantially vertical orientation, it is understood that wells may also be inclined and even horizontally completed, as shown at well site 200. When the descriptive terms "up" and "down" or "upper" and "lower" or similar terms are used in reference to a drawing, they are intended to indicate location on the drawing page, and not necessarily orientation in the ground, as the present inventions have utility no matter how the wellbore is orientated. It is also noted that the present inventions have equal utility in vertically completed wells, horizontally completed wells, or in multi-lateral deviated wells.

In FIG. 2, the nodes 280, 282 are shown schematically. However, FIG. 3 offers an enlarged perspective view of an illustrative pipe joint 300, along with an intermediate communications node 350. The illustrative communications node 350 is shown exploded away from the pipe joint 300.

Figure 3:
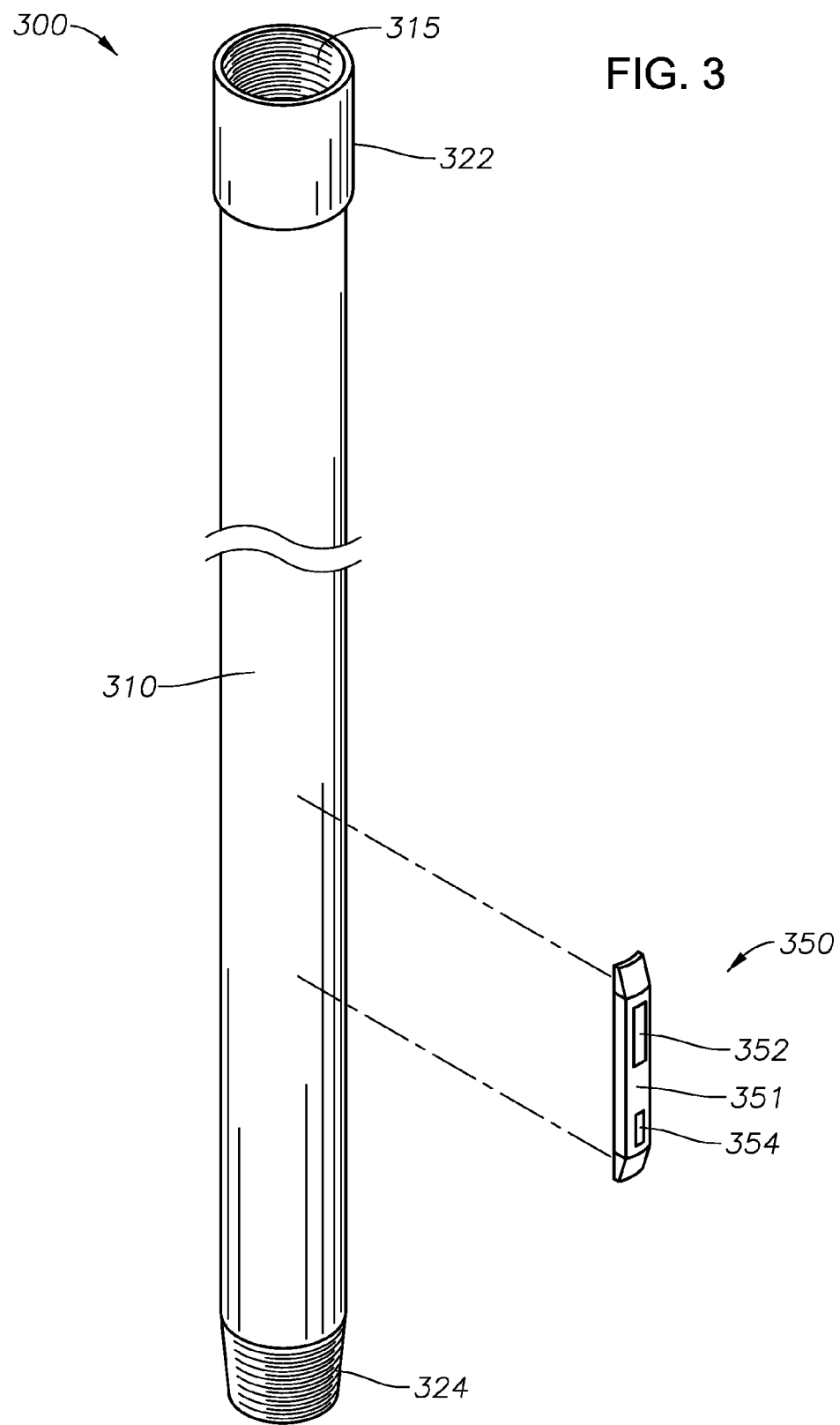
FIG. 3 is a perspective view of an illustrative pipe joint. A communications node of the present invention, in one embodiment, is shown exploded away from the pipe joint.

In FIG. 3, the exemplary illustrated pipe joint 300 is intended to represent a joint of pipe, such as drill pipe as used in a drill string. However, the pipe joint 300 may be any other tubular body such as a joint of tubing, drill pipe, well casing, pipeline, or any other tubular member used in wellbore or fluid transmission operations. The illustrated exemplary pipe joint 300 has an elongated wall 310 defining an internal bore 315, and may include box and pin connections, buttress connections, or collared connections. The bore 315 transmits drilling fluids such as an oil based mud, or OBM, during a drilling operation, or in pipeline operations, more commonly will transmit fluids such as hydrocarbons, water, and mixtures thereof.

The illustrated pipe joint 300 illustrates a box end 322, having internal threads, such as an integrated box end or a collared threaded connector. In addition, the pipe joint 300 has a pin end 324 having external threads. The threads may be of any design. Tubing joints and casing joints have a slightly different general end appearance than the illustrated drill pipe joint, but these are also tubular bodies that may be equipped similar to the illustrated drill pipe joint 300.

As noted, an illustrative communications node 350 is shown exploded away from the pipe joint 300. The communications node 350 is designed to attach to the wall 410 of the pipe joint 300 at a selected location. In one aspect, each pipe joint 300 will have a communications node 350 between the box end 322 and the pin end 324. In one arrangement, the communications node 350 is placed immediately adjacent the box end 322 or, alternatively, immediately adjacent the pin end 324 of every joint of pipe. In another arrangement, the communications node 350 is placed at a selected location along every second or every third pipe joint 300 in a drill string. In still another arrangement, at least some pipe joints 300 receive two communications nodes 350.

The communications node 350 shown in FIG. 3 is designed to be pre-welded onto the wall 310 of the pipe joint 300. Alternatively, the communications node 350 may be glued using an adhesive such as epoxy. However, it is preferred that the communications node 350 be configured to be selectively attachable to/detachable from a pipe joint 300 by mechanical means at a well site. This may be done, for example, through the use of clamps. Such a clamping system is shown at 600 in FIG. 6, described more fully below. In any instance, the communications node 350 is an independent wireless communications device that is designed to be attached preferably to an external surface of a well pipe, but may also be attached to an inner surface, an end surface (on the cross-sectional end face of a connection), embedded within a wall of the tubular, and/or combinations thereof.

There are benefits to the use of an externally-placed communications node that uses acoustic waves. For example, such a node will not interfere with the flow of fluids within the internal bore 315 of the pipe joint 300.

Further, installation and mechanical attachment can be readily assessed or adjusted, as necessary.

In FIG. 3, the intermediate communications node 350 includes an elongated body 351. The body 351 supports one or more batteries, shown schematically at 352. The body 351 also supports an electro-acoustic transducer, shown schematically at 354. The electro-acoustic transducer 354 is associated with a transceiver that receives acoustic signals at a first frequency, converts the received signals into a digital signal, converts the digital signal back into an acoustic signal, and transmits the acoustic signal at a second different frequency to a next communications node.

The communications node 350 is intended to represent the communications nodes 280 of FIG. 2, in one embodiment. The electro-acoustic transducer 354 in each node 280 allows signals to be sent from node-to-node, up the wellbore 250, as acoustic waves. The acoustic waves may be at a frequency of, for example, between about 100 kHz and 125 kHz. A last subsurface communications node 280 transmits the signals to the topside node 282. Beneficially, the subsurface communications nodes 180 do not require a wire or cable to transmit data to the surface. Preferably, communication is routed around nodes which are not functioning properly.

In FIG. 2, the communications nodes 280 are specially designed to withstand the corrosion and environmental conditions (high temperature, high pressure) of a wellbore 250. To do so, it is preferred that the communications nodes 280 include steel, fluid-sealed housings for holding the electronics. In one aspect, the steel material is a corrosion resistant alloy.

FIG. 4A is a perspective view of a communications node 400 as may be used in the wireless data transmission system of FIG. 2 (or other wellbore), in one embodiment. The communications node 400 is designed to provide one-way communication using a transceiver within a novel downhole housing assembly. FIG. 4B is a cross-sectional view of the communications node 400 of FIG. 4A. The view is taken along the longitudinal axis of the node 400. The communications node 400 will be discussed with reference to FIGS. 4A and 4B, together.

The communications node 400 first includes a fluid-sealed housing 410. The housing 410 is designed to be attached to an outer wall of a joint of wellbore pipe, such as the pipe joint 300 of FIG. 3. Where the wellbore pipe is a carbon steel pipe joint such as drill pipe, casing or liner, the housing 410 is preferably fabricated from carbon steel. This metallurgical match avoids galvanic corrosion at the coupling.

The housing 410 includes an outer wall 412. The wall 412 is dimensioned to protect internal electronics for the communications node 400 from wellbore fluids and pressure. In one aspect, the wall 412 is about 0.2 inches (0.51 cm) in thickness. The housing 410 optionally also has a protective outer layer 425. The protective outer layer 425 resides external to the wall 412 and provides an additional thin layer of protection for the electronics.

A bore 405 is formed within the wall 412. The bore 405 houses the electronics, shown in FIG. 4B as a battery 430, a power supply wire 435, a transceiver 440, and a circuit board 445. The circuit board 445 will preferably include a micro-processor or electronics module that processes acoustic signals. An electro-acoustic transducer 442 is provided to convert acoustical energy to electrical energy (or vice-versa) and is coupled with outer wall 412 on the side attached to the tubular body. The transducer 442 is in electrical communication with a sensor 432.

It is noted that in FIG. 4B, the sensor 432 resides within the housing 410 of the communications node 400. However, as noted, the sensor 432 may reside external to the communications node 400, such as above or below the node 400 along the wellbore. In FIG. 4C, a dashed line is provided showing an extended connection between the sensor 432 and the electro-acoustic transducer 442.

The transceiver 440 will receive an acoustic telemetry signal. In one preferred embodiment, the acoustic telemetry data transfer is accomplished using multiple frequency shift keying (MFSK). Any extraneous noise in the signal is moderated by using well-known conventional analog and/or digital signal processing methods. This noise removal and signal enhancement may involve conveying the acoustic signal through a signal conditioning circuit using, for example, a bandpass filter.

The transceiver will also produce acoustic telemetry signals. In one preferred embodiment, an electrical signal is delivered to an electromechanical transducer, such as through a driver circuit. In a preferred embodiment, the transducer is the same electro-acoustic transducer that originally received the MFSK data. The signal generated by the electro-acoustic transducer then passes through the housing 410 to the tubular body (such as casing string 220), and propagates along the tubular body to other communication nodes. The re-transmitted signal represents the same sensor data originally transmitted by an intermediate communications node 280 housing a geophone or other sensor. In one aspect, the acoustic signal is generated and received by a magnetostrictive transducer comprising a coil wrapped around a core as the transceiver. In another aspect, the acoustic signal is generated and received by a piezo-electric ceramic transducer. In either case, the electrically encoded data are transformed into a sonic wave that is carried through the wall of the tubular body in the wellbore.

The transceiver 440 is associated with a specific joint of pipe. That joint of pipe, in turn, has a known location or depth along the wellbore. The acoustic wave as originally transmitted from the transceiver 440 will represent a packet of information. The packet will include an identification code that tells a receiver (such as receiver 270 in FIG. 2) where the signal originated, that is, which communications node 400 it came from. In addition, the packet will include an amplitude value originally recorded by the communications node 400 for its associated joint of pipe.

When the signal reaches the receiver at the surface, the signal is processed. This involves identifying which communications node the signal originated from, and then determining the location of that communications node along the wellbore. This further involves analyzing seismic data generated by micro-seismic events in the subsurface formation.

The communications node 400 optionally also includes a sensor 432. Here, the sensor 432 is a tri-axial geophone that detects elastic waves incident to a formation fracturing operation. The sensor 432 sends signals to the transceiver 440 through a short electrical wire or through the printed circuit board 445. Signals from the sensor 432 are converted into acoustic signals using an electro-acoustic transducer 442, that are then sent by the transceiver 440 as part of the packet of information.

In at least three of the communications nodes 280, the sensor 432 represents a geophone. The geophone "listens" for elastic waves created during a formation fracturing process. These waves are converted into acoustic signals, and then sent by the transceiver 440 in that communications node 400. Preferably, the orientation and depth of the sensor 432 is measured after the casing string on which it is attached is installed in the wellbore. Optionally, the casing string may be rotated or otherwise manipulated to place the sensor and its associated sensor communications node in a desired orientation.

The acoustic signals are sent from an originating subsurface communications node 400 up the wellbore 250. The signals represent a packet of information that includes (i) an identifier for the subsurface communications node originally transmitting the signal, and (ii) an acoustic waveform indicative of elastic waves caused by movement of rock within the subsurface formation during the fracturing operation. The acoustic signals are sent, node-to-node, until they are delivered to the receiver 270.

The signals are compiled at the receiver 270. The signals are then processed, either at the receiver 270 or at a much larger and faster computing system in a data processing facility. As with any seismic analysis process, the processing requires that certain parameters be obtained for the rock matrix within the subsurface formation 255 beforehand. This includes an understanding of the rock type and density so that P-wave (pressure) velocity and/or S-wave (shear) velocity may be determined. The determination is generally based on existing data as obtained from well logs, core samples and previous seismic data.

A correlation exists between rock material properties and the speed or velocity at which sound waves travel through the rock media. Where the seismic waves are "P" waves, velocity (v) may be computed as:

$$v = \sqrt{\frac{\lambda + 2\mu}{\rho}}$$

where:
λ=Lame' constant,
μ=shear modulus, and
ρ=density of the rock layer i.
Where the seismic waves are "S" waves, velocity (v) may be computed as:

$$v = \sqrt{\frac{\mu}{\rho}}$$

where:
μ=shear modulus, and
ρ=density of the rock layer i.

Using these equations, the operator will know the speed at which elastic waves will travel from a fracture tip 152 to a geophone 432.

It is noted that the seismic processing undertaken in the present process is different from the seismic processing frequently used in subsurface exploration operations. Normal seismic operations involve an analysis of seismic reflections that occur in response to energy sources sending acoustic energy down into the earth. Receivers gather raw seismic data from reflections of the acoustic energy off of the various subsurface strata. Large scale seismic operations today frequently employ complex inversion methods to analyze seismic reflection data from preprocessed partial stacks. Wavelets are identified and reflectivity equations are applied to distinguish subsurface formations.

In the present application, a plurality of sensors will detect elastic waves within the subsurface formation 255. A set of waves will be detected within a very small time frame, such as 250 microseconds. An assumption is then made that those waves within a set are indicative of the same micro-seismic event. An algorithm is applied that compares the time at which each event is heard with the known velocity v of the elastic waves. A triangulation may then be made to determine the origin of the elastic wave under analysis.

Triangulation data is accumulated at the surface. In one aspect, a binary code is assigned to a triangulation result that is indicative of azimuth, orientation and depth. The triangulation results are then compiled so that a map of the micro-seismic events may be created. In the seismic arts, this step is referred to as "imaging." The map is viewed at the surface to determine the extent of subsurface fractures across the various zones 202, 204, 206.

Only a small number of subsurface communications nodes 280 will house sensors. However, some communications nodes 280 may house a temperature sensor as the sensor 432. In this instance, acoustic signals are sent from an originating subsurface communications node 400 up the wellbore 250. The signals represent a packet of information that includes (i) an identifier for the subsurface communications node originally transmitting the signal, and (ii) an acoustic waveform indicative of temperature readings taken by the temperature sensor. The acoustic signals are sent, node-to-node, until they are delivered to the receiver 270.

The signals are compiled at the receiver 270. The signals are then read as pure data without processing. Alternatively, the signals may be integrated into the subsurface mapping. In this respect, changes in temperature may be indicative of fracture formation activity.

Returning again to FIGS. 4A and 4B, the communications node 400 also optionally includes a shoe 500. More specifically, the node 400 includes a pair of shoes 500 disposed at opposing ends of the wall 412. Each of the shoes 500 provides a beveled face that helps prevent the node 400 from hanging up on an external tubular body or the surrounding earth formation, as the case may be, during run-in or pull-out. The shoes 500 may have a protective outer layer 522 and an optional cushioning material 524 under the outer layer 522.

FIGS. 5A and 5B are perspective views of an illustrative shoe 500 as may be used on an end of the communications node 400 of FIG. 4A, in one embodiment. In FIG. 5A, the leading edge or front of the shoe 500 is seen, while in FIG. 5B the back of the shoe 500 is seen.

The shoe 500 first includes a body 510. The body 510 includes a flat under-surface 612 that butts up against opposing ends of the wall 412 of the communications node 400.

Extending from the under-surface 512 is a stem 520. The illustrative stem 520 is circular in profile. The stem 520 is dimensioned to be received within opposing recesses 414 of the wall 412 of the node 400.

Extending in an opposing direction from the body 510 is a beveled surface 530. As noted, the beveled surface 530 is designed to prevent the communications node 400 from hanging up on an object during run-in into a wellbore.

Behind the beveled surface 530 is a flat (or slightly arcuate) surface 535. The flat surface 535 is configured to extend along the casing string 220 (or other tubular body) when the communications node 400 is attached along the tubular body. In one aspect, the shoe 500 includes an optional shoulder 515. The shoulder 515 creates a clearance between the flat surface 535 and the tubular body opposite the stem 520.

In one arrangement, the communications nodes 400 with the shoes 500 is welded onto an outer surface of the tubular body, such as wall 310 of the pipe joint 300. More specifically, the body 410 of the respective communications nodes 400 is welded onto the wall of a joint of casing. In some cases, it may not be feasible or desirable to pre-weld the communications nodes 400 onto pipe joints before delivery to a well site. Further still, welding may degrade the tubular integrity or damage electronics in the housing 410. Therefore, it is desirable to utilize a clamping system that allows a drilling or service company to mechanically connect/disconnect the communications nodes 400 along a tubular body as the tubular body is being run into a wellbore.

Figure 6:
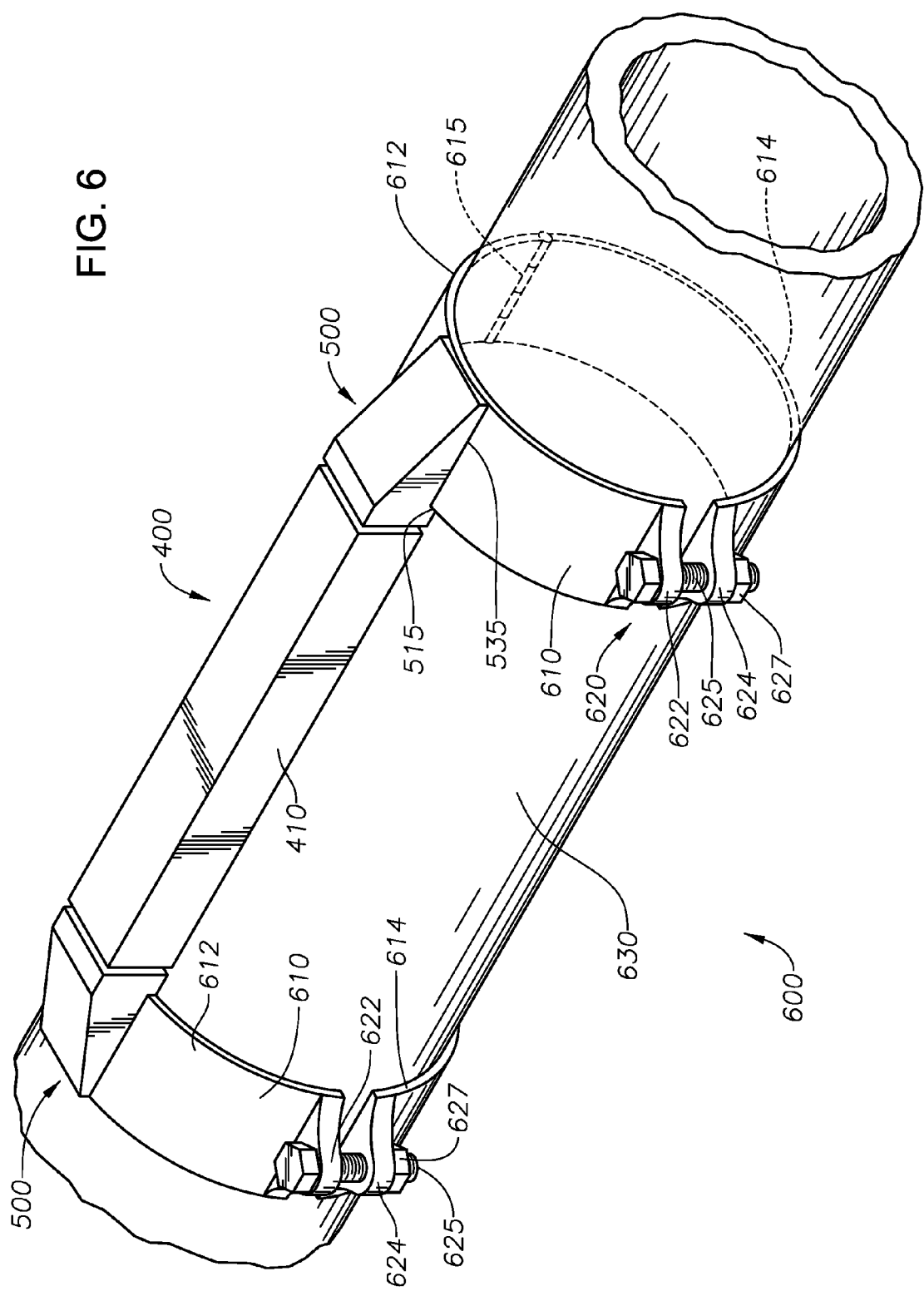
FIG. 6 is a perspective view of a communications node system of the present invention, in one embodiment. The communications node system utilizes a pair of clamps for connecting a communications node onto a tubular body.

FIG. 6 is a perspective view of a communications node system 600 of the present invention, in one embodiment. The communications node system 600 utilizes a pair of clamps 610 for mechanically connecting a communications node 400 onto a tubular body 630 such as a joint of casing or liner.

The system 600 first includes at least one clamp 610. In the arrangement of FIG. 6, a pair of clamps 610 is used. Each clamp 610 abuts the shoulder 615 of a respective shoe 500. Further, each clamp 610 receives the base 535 of a shoe 500. In this arrangement, the base 535 of each shoe 500 is welded onto an outer surface of the clamp 610. In this way, the clamps 610 and the communications node 400 become an integral tool.

The illustrative clamps 610 of FIG. 6 include two arcuate sections 612, 614. The two sections 612, 614 pivot relative to one another by means of a hinge. Hinges are shown in phantom at 615. In this way, the clamps 610 may be selectively opened and closed.

Each clamp 610 also includes a fastening mechanism 620. The fastening mechanisms 620 may be any means used for mechanically securing a ring onto a tubular body, such as a hook or a threaded connector. In the arrangement of FIG. 6, the fastening mechanism is a threaded bolt 625. The bolt 625 is received through a pair of rings 622, 624. The first ring 622 resides at an end of the first section 612 of the clamp 610, while the second ring 624 resides at an end of the second section 614 of the clamp 610. The threaded bolt 625 may be tightened by using, for example, one or more washers (not shown) and threaded nuts 627.

In operation, a clamp 610 is placed onto the tubular body 630 by pivoting the first 612 and second 614 arcuate sections of the clamp 610 into an open position. The first 612 and second 614 sections are then closed around the tubular body 630, and the bolt 625 is run through the first 622 and second 624 receiving rings. The bolt 625 is then turned relative to the nut 627 in order to tighten the clamp 610 and connected communications node 400 onto the outer surface of the tubular body 630. Where two clamps 610 are used, this process is repeated.

The tubular body 630 is preferably a string of casing such as the casing string 220 of FIG. 2. In any instance, the wall 412 of the communications node 400 is fabricated from a steel material having a resonance frequency compatible with the resonance frequency of the tubular body 630. Stated another way, the mechanical resonance of the wall 412 is at a frequency contained within the frequency band used for telemetry.

In one aspect, the communications node 400 is about 12 to 16 inches (0.30 to 0.41 meters) in length as it resides along the tubular body 630. Specifically, the housing 410 of the communications node may be 8 to 10 inches (0.20 to 0.25 meters) in length, and each opposing shoe 500 may be 2 to 5 inches in length. Further, the communications node 400 may be about 1 inch in width and 1 inch in height. The base 410 of the communications node 400 may have a concave profile that generally matches the radius of the tubular body 630.

A method for generate an image of subsurface fractures around a wellbore. The method preferably employs the communications node 400 and the clamping system 600 of FIG. 6.

Figure 7:
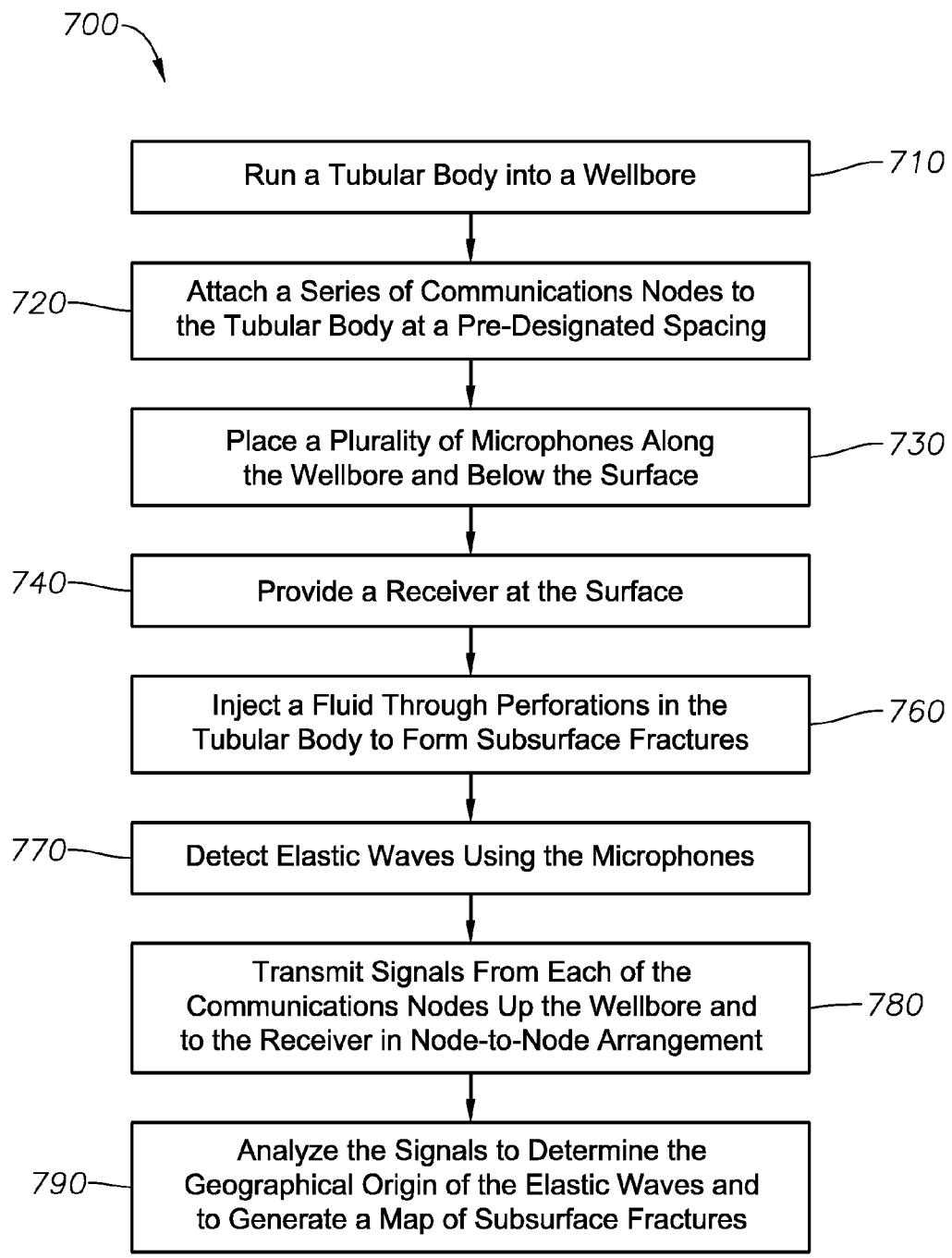
FIG. 7 is a flowchart demonstrating steps of a method for transmitting data in a wellbore in accordance with the present inventions, in one embodiment.

FIG. 7 provides a flow chart for a method 700 for evaluating fracture geometry in a subsurface formation. The method 700 uses a plurality of data transmission nodes situated along a casing string to accomplish a wireless transmission of data along the wellbore. The data represents signals that indicate the presence of elastic waves within the subsurface formation during a wellbore operation. Such a wellbore operation may be a formation fracturing operation, a subsurface fluid disposal operation, a water flooding operation, or an injection of drill cuttings.

The method 700 first includes running a tubular body into the wellbore. This is shown at Box 710. The tubular body is formed by connecting a series of pipe joints end-to-end, with the pipe joints being connected by threaded couplings. The joints of pipe are fabricated from a steel material, with the steel material being suitable for conducting an acoustic signal.

The method 700 also provides for attaching a series of communications node to the joints of pipe. This is provided at Box 720. The communications nodes are attached according to a pre-designated spacing. In one aspect, the communications nodes are spaced according to the length of the individual pipe joints. Preferably, each of the subsurface communications nodes is attached to a joint of pipe by one or more clamps. In this instance, the step 720 of attaching the communications nodes to the joints of pipe comprises clamping the communications nodes to an outer surface of the joints of pipe. Alternatively, an adhesive material or welding may be used for the attaching step 720.

In one aspect, the series of communications nodes includes a topside communications node and a plurality of subsurface communications nodes. The topside communications node is the uppermost communications node along the wellbore. The topside communications node may be attached to a joint of casing proximate the surface. More preferably, the topside communications node is connected to the wellhead. The topside communications node transmits signals from an uppermost subsurface communications node to a receiver at the surface.

As noted, the communications nodes also include a plurality of subsurface communications nodes. The subsurface communications nodes reside along the casing string below the topside communications nodes.

The subsurface communications nodes are placed in spaced-apart relation along the casing string. The subsurface communications nodes are configured to transmit acoustic waves from the subsurface formation to the topside communications node. Each subsurface communications node includes a transceiver that receives an acoustic signal from a previous communications node, and then transmits or relays that acoustic signal to a next communications node, in node-to-node arrangement, up to the surface.

The method 700 further includes placing a plurality of sensors along the tubular body. This is indicated at Box 730. The sensors are preferably tri-axial geophones that are stored within the housing of select subsurface communications nodes. At least two sensors are provided along the wellbore.

The method 700 also includes providing a receiver. This is shown at Box 740. The receiver is placed at the surface.

The receiver has a processor that processes signals received from the topside communications node, such as through the use of firmware and/or software. The receiver preferably receives electrical or optical signals via a so-called "Class I, Division I" conduit or through a radio signal. The processor processes signals to identify which signals correlate to which sensor. This may involve the use of a multiplexer or a pulse-receive switch.

The method 700 next includes detecting elastic waves. This is shown at Box 770. The elastic waves are detected by the geophones selectively placed along the tubular body. Preferably, the elastic waves are generated as a result of a fracturing operation. Thus, the method 700 may include the step of injecting a fluid through perforations in the tubular body so as to form the subsurface fractures. This is provided at Box 760, before the step 770 of detecting elastic waves.

The step 770 of detecting elastic waves means sensing P-waves and/or S-waves. These waves are generated by the rock matrix making up the subsurface formation undergoing slippage and expansion at the fracture tips. The at least two sensors receive these waves and send them to an electro-acoustic transducer within a subsurface communications node as signals. In operation, the sensors listen for elastic waves within the subsurface formation. The sensors then send electrical signals to an electro-acoustic transducer within a subsurface communications node, which then converts those electrical signals into acoustic signals that have a resonance amplitude.

The method 700 further comprises transmitting signals from each of the communications nodes up the wellbore, node-to-node, and to the receiver. This is provided at Box 780. In one aspect, piezo wafers or other piezoelectric elements are used to receive and transmit acoustic signals. In another aspect, multiple stacks of piezoelectric crystals or other magnetostrictive devices are used as a transducer. Signals are created by applying electrical signals of an appropriate frequency across one or more piezoelectric crystals, causing them to vibrate at a rate corresponding to the frequency of the desired acoustic signal.

In one aspect, the data transmitted between the nodes is represented by acoustic waves according to a multiple frequency shift keying (MFSK) modulation method. Although MFSK is well-suited for this application, its use as an example is not intended to be limiting. It is known that various alternative forms of digital data modulation are available, for example, frequency shift keying (FSK), multi-frequency signaling (MF), phase shift keying (PSK), pulse position modulation (PPM), and on-off keying (OOK). In one embodiment, every 4 bits of data are represented by selecting one out of sixteen possible tones for broadcast.

Acoustic telemetry along tubulars is characterized by multi-path or reverberation which persists for a period of milliseconds. As a result, a transmitted tone of a few milliseconds duration determines the dominant received frequency for a time period of additional milliseconds. Preferably, the communication nodes determine the transmitted frequency by receiving or "listening to" the acoustic waves for a time period corresponding to the reverberation time, which is typically much longer than the transmission time. The tone duration should be long enough that the frequency spectrum of the tone burst has negligible energy at the frequencies of neighboring tones, and the listening time must be long enough for the multipath to become substantially reduced in amplitude. In one embodiment, the tone duration is 2 ms, then the transmitter remains silent for 48 milliseconds before sending the next tone. The receiver, however, listens for 2+48=50 ms to determine each transmitted frequency, utilizing the long reverberation time to make the frequency determination more certain. Beneficially, the energy required to transmit data is reduced by transmitting for a short period of time and exploiting the multi-path to extend the listening time during which the transmitted frequency may be detected.

In one embodiment, an MFSK modulation is employed where each tone is selected from an alphabet of 16 tones, so that it represents 4 bits of information. With a listening time of 50 ms, for example, the data rate is 80 bits per second.

The tones are selected to be within a frequency band where the signal is detectable above ambient and electronic noise at least two nodes away from the transmitter node so that if one node fails, it can be bypassed by transmitting data directly between its nearest neighbors above and below. In one example the tones are evenly spaced in period within a frequency band from about 100 kHz to 125 kHz. In another example, the tones are evenly spaced in frequency within a frequency band from about 100 kHz to 125 kHz.

Preferably, the nodes employ a "frequency hopping" method where the last transmitted tone is not immediately re-used. This prevents extended reverberation from being mistaken for a second transmitted tone at the same frequency. For example, 17 tones are utilized for representing data in an MFSK modulation scheme; however, the last-used tone is excluded so that only 16 tones are actually available for selection at any time.

The communications nodes will transmit data as mechanical waves at a rate exceeding about 50 bps.

In one embodiment, each of the subsurface communications nodes also includes a temperature sensor, a strain gauge, or other sensor that is believed to be responsive to subsurface fracture formation. The communications nodes are then designed to generate a signal that corresponds to readings sensed by the respective temperature (or other) sensors along their corresponding joints of pipe.

The method 700 also includes analyzing the signals from the communications nodes. This is seen at Box 790. The signals are analyzed to determine the origin of the elastic waves within the subsurface formation. This may be done, for example, by determining which sensor received the elastic signals, and then triangulating the signals to determine their geographic origin. From this information, a map of subsurface fractures may be generated.

In order to carry out the analyzing step of Box 790, the signals received by the receiver will represent packets of information. Each packet will have (i) an identifier for a subsurface communications node originally transmitting the signal, and (ii) an acoustic amplitude value for the subsurface communications node originally transmitting the signal. The acoustic waveform will be indicative of elastic waves caused by movement of rock within the subsurface formation during a wellbore operation.

The receiver (or a processor associated with the receiver) may make a correlation between the strength of an amplitude value and the distance of the fracture generating the original elastic wave from the wellbore. The receiver may further compare signals that are received during a same time period and then triangulate those signals to determine a location of the elastic wave.

In one aspect, each packet will also have (iii) an acoustic amplitude value indicative of a sensed subsurface characteristic, such as casing strain or wellbore temperature. Where the signals correspond to temperature readings, for example, the signals are analyzed to determine if one of the sensors is detecting a change in temperature, such as may occur during gas production due to gas expansion. This may be indicative of fluid flow in the formation, which in turn may be indicative of a subsurface fracture.

In the method 700, each of the communications nodes has an independent power source. The independent power source may be, for example, batteries or a fuel cell. In addition, each of the intermediate communications nodes has a transducer.

Preferably, the electro-acoustic transducer receives acoustic signals at a first frequency, and then sends acoustic signals at a second frequency that is different from the first frequency. Each transducer then "listens" for signals at the second frequency. Preferably, each transducer "listens" for the acoustic waves sent at the first frequency until after reverberation of the acoustic waves at the first frequency has substantially attenuated. Thus, a time is selected for both transmitting and for receiving. In one aspect, the listening time may be about twice the time at which the waves at the first frequency are transmitted or pulsed. To accomplish this, the transducer will operate with and under the control of a micro-processor located on a printed circuit board, along with memory. Beneficially, the energy required to transmit signals is reduced by transmitting for a shorter period of time.

A separate method of evaluating fracture geometry in a subsurface formation is provided herein. The fracture geometry is created in response to a wellbore operation. Preferably, the wellbore operation is a formation fracturing operation.

The method first includes receiving signals from a wellbore. Each signal defines a packet of information having (i) an identifier for a subsurface communications node originally transmitting the signal, and (ii) an acoustic amplitude value for the subsurface communications node originally transmitting the signal.

The method also includes correlating communications nodes to their respective locations in the wellbore. In addition, the method comprises analyzing the amplitude values to determine whether any of such amplitude values are indicative of elastic waves caused by movement of rock within the subsurface formation during a wellbore operation.

The method further includes analyzing the signals to determine the geographical origin of the elastic waves. This may first be done by correlating the strength of the amplitude values to distance, thereby inferring a distance that an elastic wave was originally generated from the wellbore. This, in turn, predicts the location of a subsurface fracture. Analyzing the signals may further include comparing signals recorded proximate a same time frame, and then triangulating those signals relative to time to obtain an azimuth and orientation of the signals This also predicts the location of a subsurface fracture.

The method further includes generating a map of subsurface fractures from the analyzed signals.

In this method, the subsurface communications nodes may be constructed in accordance with communications node 350 of FIG. 3, communications node 400 of FIG. 4A, or other arrangement for acoustic transmission of data. Preferably, each of the subsurface communications nodes is attached to an outer wall of the casing string according to a pre-designated spacing, and resides within the annular region. The subsurface communications nodes are configured to communicate by acoustic signals transmitted through the casing string. In addition, selected communications nodes will have geophones and, optionally temperature (or other) sensors for detecting subsurface conditions.

In one aspect, each of the subsurface communications nodes further comprises a temperature sensor. The communications nodes are then designed to generate a signal that corresponds to temperature readings taken by the temperature sensors. The electro-acoustic transceivers in the subsurface communications nodes transmit acoustic signals up the wellbore representative of the temperature readings, node-to-node. In this instance, the packet of information generated by each subsurface communications node further has (iii) an acoustic waveform indicative of a temperature reading. In addition, the method further comprises analyzing the temperature readings to determine whether any of such temperature readings are indicative of a poor cement sheath along the wellbore.

In one aspect, analyzing the temperature readings comprises identifying temperature values generated by each of the subsurface communications nodes, and comparing those temperature values to a baseline temperature value. The baseline temperature value may be (i) a previously stored temperature value indicative of a temperature value of a joint of casing having a freshly-cemented annular region, or (ii) a moving average of temperature readings taken from a pre-designated number of communications nodes in proximity to a subject communications node in the wellbore.

As can be seen, a novel downhole telemetry system is provided, as well as a novel method for the wireless transmission of information using a plurality of data transmission nodes. Beneficially, there is no need to specially machine pipe ends to include electrodes or induction coils as is known in some existing wellbore telemetry systems. In the present systems, the repertoire of frequencies used by the nodes for communication, the amplitude of each frequency, the time duration for which each frequency is transmitted, and the time between signals may be optimized to find a balance between data transmission rate and energy used in data transmission.

The acoustic telemetry system disclosed herein has a number of applications besides detecting initial fracture tip formation. These include monitoring a production well for micro-seismic events during production, monitoring an injection well for micro-seismic events during injection, monitoring a production well for micro-seismic events during re-fracking, and monitoring a plurality of wellbores in a field for early warning of formation subsidence.

While it will be apparent that the inventions herein described are well calculated to achieve the benefits and advantages set forth above, it will be appreciated that the inventions are susceptible to modification, variation and change without departing from the spirit thereof.

What is claimed is:

1. An electro-acoustic telemetry system for evaluating fracture geometry in a subsurface formation, comprising:
  a casing string disposed in a wellbore, the casing string being comprised of pipe joints connected end-to-end;
  at least two sensors disposed along the wellbore and configured to detect elastic waves within the subsurface formation;
  a series of communications nodes placed along the wellbore, the communications nodes being configured to relay acoustic signals indicative of elastic waves caused by movement of rock within the subsurface formation as detected by the sensors;
  a receiver at the surface configured to receive signals from an uppermost of the communications nodes;
  wherein each of the communications nodes comprises:
    a sealed housing;
    an electro-acoustic transducer and associated transceiver also residing within the housing designed to relay acoustic signals from node-to-node up the wellbore and to the receiver during a wellbore operation; and an independent power source residing within the housing providing power to the transceiver.

2. The electro-acoustic telemetry system of claim 1, wherein the series of communications nodes comprises:

two or more sensor communications node connected to an outer surface of the casing string, the sensor communications nodes configured to receive signals from respective sensors;

a topside communications node placed proximate a surface of the wellbore; and a plurality of intermediate communications nodes spaced along the wellbore between the sensor communications nodes and the topside communications node.

3. The electro-acoustic telemetry system of claim 2, wherein:

each of the at least two sensors resides within the housing of a selected sensor communications node;

the electro-acoustic transducers within the selected subsurface communications nodes convert signals from the sensors into acoustic signals for the associated transceivers; and each of the sensor communications nodes is configured to generate a signal from the transceiver representing a packet of information that comprises an identifier for the sensor communications node that originally transmitted the signal, and an acoustic waveform representing the elastic waves detected by its corresponding sensor.

4. The electro-acoustic telemetry system of claim 3, wherein a frequency band for the acoustic waveform transmission by the transceivers is about 25 kHz wide.

5. The electro-acoustic system of claim 3, wherein a frequency band for the acoustic wave transmission by the transceivers operates from about 100 kHz to 125 kHz.

6. The electro-acoustic telemetry system of claim 3, wherein the acoustic waveforms provide data that is modulated by (i) a multiple frequency shift keying method, (ii) a frequency shift keying method, (iii) a multi-frequency signaling method, (iv) a phase shift keying method, (v) a pulse position modulation method, or (vi) an on-off keying method.

7. The electro-acoustic telemetry system of claim 2, wherein the intermediate communications nodes are spaced apart such that each joint of pipe supports at least one intermediate communications node.

8. The electro-acoustic telemetry system of claim 2, wherein the intermediate communications nodes are spaced at about 10 to 100 foot (3.0 to 30.5 meter) intervals.

9. The electro-acoustic telemetry system of claim 2, wherein the sensor communications nodes and the intermediate communications nodes transmit data in acoustic form at a rate exceeding about 50 bps.

10. The electro-acoustic telemetry system of claim 2, wherein each of the at least two sensors is a microphone or a geophone.

11. The electro-acoustic telemetry system of claim 2, wherein each of the electro-acoustic transceivers in the intermediate communications nodes is designed to receive acoustic waves at a first frequency, and then transmit the acoustic waves at a second different frequency up the wellbore to a next subsurface communications node.

12. The electro-acoustic telemetry system of claim 11, wherein each intermediate communications node listens for the acoustic waves generated at the first frequency for a longer time than the time for which the acoustic waves were generated at the second frequency by a previous intermediate communications node.

13. The electro-acoustic telemetry system of claim 2, wherein:

a well head is placed above the wellbore; and the topside communications node is placed (i) on an outer surface of the well head or (ii) on an outer surface of an uppermost joint of the casing string.

14. The electro-acoustic telemetry system of claim 13, wherein the signal from the topside communications node to the receiver is transmitted via a Class I, Division I conduit or a wireless transmission.

15. The electro-acoustic telemetry system of claim 2, wherein the intermediate communications nodes are attached to the outer wall of the casing string by (i) an adhesive material, (ii) welding, or (iii) one or more mechanical fasteners.

16. The electro-acoustic telemetry system of claim 2, wherein:

each of the intermediate communications nodes is attached to the casing string by one or more clamps; and each of the one or more clamps comprises:

a first arcuate section;

a second arcuate section;

a hinge for pivotally connecting the first and second arcuate sections; and a fastening mechanism for securing the first and second arcuate sections around an outer surface of the casing string.

17. The electro-acoustic telemetry system of claim 1, further comprising:

a processor programmed to correlate signals from the elastic wave sensors with the respective subsurface communications nodes, identify a source location of the elastic waves within the subsurface formation, and then generate a subsurface map reflecting geographic origins of the elastic waves.

18. The electro-acoustic telemetry system of claim 16, wherein:

selected communications nodes further comprise a temperature sensor, with those selected communications nodes being designed to generate a signal that corresponds to temperature readings taken by the respective temperature sensors; and the transceivers transmit acoustic signals up the wellbore representative of the temperature readings, node-to-node, as part of the packets of information.

19. The electro-acoustic telemetry system of claim 17, wherein the processor is further programmed to identify temperature values generated by the selected subsurface communications node and compare those temperature values to a baseline temperature value.

20. A method of evaluating fracture geometry in a subsurface formation, comprising:

running joints of casing into the wellbore, the joints of casing being connected by threaded couplings to form a casing string;

attaching a series of communications nodes to the joints of casing according to a pre-designated spacing, wherein adjacent communications nodes are configured to communicate by acoustic signals transmitted through the joints of casing, and wherein each of the communications nodes comprises:
a sealed housing;
an electro-acoustic transducer and associated transceiver residing within the housing configured to relay signals, with each signal representing a packet of information that comprises (i) an identifier for the subsurface communications node originally transmitting the signal, and (ii) an acoustic waveform indicative of elastic waves caused by movement of rock within the subsurface formation during a wellbore operation; and
an independent power source also residing within the housing for providing power to the transceiver;
sending signals from the communications nodes to a receiver at a surface via the series of communications nodes;
processing the signals to determine the geographical origin of the elastic waves; and
generating a map of subsurface fractures from the processed signals.

21. The method of claim 20, wherein the surface is an earth surface, or a drilling or production platform over a water surface.

22. The method of claim 20, wherein the housing for each of the communications nodes is fabricated from a steel material, with the steel material of the housing having a resonant frequency within a width of the resonant frequency of the acoustic waveforms transmitted through the joints of casing.

23. The method of claim 20, wherein:
the movement of rock is detected by sensors residing within the subsurface communications nodes originally transmitting the signals.

24. The method of claim 20, wherein each of the at least two sensors is a microphone or a geophone.

25. The method of claim 24, further comprising:
injecting a fluid through perforations in the casing string under pressure in order to form subsurface fractures; and
using the sensors, detecting elastic waves generated as a result of injecting the fluid.

26. The method of claim 20, wherein the series of communications nodes comprises:
two or more sensor communications nodes connected to an outer surface of the casing string and configured to receive signals from respective sensors along the wellbore;
a topside communications node placed proximate a surface of the wellbore; and
a plurality of intermediate communications nodes spaced along the wellbore between the sensor communications nodes and the topside communications node.

27. The method of claim 26, wherein:
the electro-acoustic transducers within the sensor communications nodes convert signals from the sensors into acoustic signals for the associated transceivers;
each of the sensor communications nodes generates a signal from the transceiver representing a packet of information that comprises an identifier for the sensor communications node that originally transmitted the signal, and an acoustic waveform representing the waves detected by its corresponding sensor; and
the topside communications node transmits the signals from an uppermost intermediate communications node to the receiver.

28. The method of claim 27, wherein a frequency band for the acoustic waveform transmission by the transceivers is about 25 kHz wide.

29. The method of claim 27, wherein a frequency band for the acoustic wave transmission by the transceivers operates from about 100 kHz to 125 kHz.

30. The method of claim 27, wherein the acoustic waveforms provide data that is modulated by (i) a multiple frequency shift keying method, (ii) a frequency shift keying method, (iii) a multi-frequency signaling method, (iv) a phase shift keying method, (v) a pulse position modulation method, or (vi) an on-off keying method.

31. The method of claim 27, wherein each of the at least two sensors resides within the housing of a selected sensor communications node.

32. The method of claim 27, wherein the intermediate communications nodes are spaced apart such that each joint of pipe supports at least one intermediate communications node.

33. The method of claim 27, wherein the intermediate communications nodes are spaced at about 20 to 40 foot (6.1 to 12.2 meter) intervals.

34. The method of claim 27, wherein the sensor communications nodes and the intermediate communications nodes transmit data in acoustic form at a rate exceeding about 50 bps.

35. The method of claim 27, wherein each of the intermediate and each of the subsurface communications nodes is attached to a wall surface of a joint of casing by (i) an adhesive material, (ii) welding, or (iii) one or more mechanical fasteners.

36. The method of claim 27, wherein:
each of the each of the intermediate and each of the subsurface communications nodes is attached to a joint of casing by one or more clamps; and
the step of attaching the communications nodes to the joints of casing comprises clamping the communications nodes to an outer surface of the joints of casing.

37. The method of claim 36, wherein each of the one or more clamps comprises:
a first arcuate section;
a second arcuate section;
a hinge for pivotally connecting the first and second arcuate sections; and
a fastening mechanism for securing the first and second arcuate sections around an outer surface of the casing string.

38. The method of claim 36, wherein:
the housing of each of the intermediate and each of the sensor communications nodes comprises a first end and a second opposite end; and
each of the one or more clamps comprises a first clamp secured at the first end of the housing, and a second clamp secured at the second end of the housing.

39. The method of claim 27, wherein analyzing the signals to determine the geographical origin of the elastic waves comprises:
receiving elastic waves generated by micro-seismic events at a plurality of sensors along the wellbore;
correlating individual micro-seismic events in two or more of the sensors; and
triangulating the individual micro-seismic events.

40. The method of claim 39, wherein triangulating is based on strength of the signals, time of receipt of the signals, or both.

41. The method of claim 39, wherein:
- at least two of the subsurface communications nodes further comprises a temperature sensor, and generate a signal that corresponds to temperature readings taken by the temperature sensor;
- the transceivers in the sensor communications nodes transmit acoustic signals up the wellbore representative of the temperature readings, node-to-node; and wherein analyzing the signals to determine the geographical origin of the elastic waves further comprises determining whether any changes in temperature readings are indicative of the presence of near-wellbore subsurface fractures.

\* \* \* \* \*